(12) United States Patent
Shih

(10) Patent No.: US 11,956,111 B2
(45) Date of Patent: Apr. 9, 2024

(54) MULTI-RATE CREST FACTOR REDUCTION

(71) Applicant: Huawei Technologies Co., Ltd., Shenzhen (CN)

(72) Inventor: Huei Yuan Shih, Murphy, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 17/760,197

(22) PCT Filed: Feb. 14, 2020

(86) PCT No.: PCT/US2020/018423
§ 371 (c)(1),
(2) Date: Aug. 5, 2022

(87) PCT Pub. No.: WO2020/118321
PCT Pub. Date: Jun. 11, 2020

(65) Prior Publication Data
US 2023/0344695 A1     Oct. 26, 2023

(51) Int. Cl.
H04L 27/26          (2006.01)
(52) U.S. Cl.
CPC ................. H04L 27/2624 (2013.01)
(58) Field of Classification Search
CPC ............. H04L 27/2601; H04L 27/2614; H04L 27/2623; H04L 27/2624; H04L 27/2626; H04L 27/2627; H04L 27/264
See application file for complete search history.

(56) References Cited

U.S. PATENT DOCUMENTS

| | | | | |
|---|---|---|---|---|
| 7,184,485 B2* | 2/2007 | Balakrishnan | ...... | H04L 27/2634 375/295 |
| 7,376,197 B2* | 5/2008 | Berangi | ................. | H04B 1/707 375/296 |
| 7,499,496 B2* | 3/2009 | Fujii | .................... | H04L 27/2621 375/267 |
| 7,580,467 B2* | 8/2009 | Sampath | ............. | H04L 25/0232 375/340 |
| 7,688,797 B2* | 3/2010 | Bolinth | ............... | H04L 27/2602 370/344 |

(Continued)

FOREIGN PATENT DOCUMENTS

WO      2014146235 A1    9/2014

*Primary Examiner* — James M Perez
(74) *Attorney, Agent, or Firm* — Slater Matsil, LLP

(57) ABSTRACT

A computer-implemented method for reducing crest factor by an electronic device includes: receiving a plurality of first samples of a first input signal. The plurality of first samples are generated at a first sampling rate. A first peak detection is performed based on the plurality of first samples to generate a plurality of first peak detection output samples. A plurality of first windowing input samples are generated at a second sampling rate by downsampling the plurality of first peak detection output samples. A plurality of first windowing output samples are generated based on the plurality of first windowing input samples. A plurality of first peak reduction samples are generated at the first sampling rate by upsampling the plurality of first windowing output samples. A first output signal is generated based on the plurality of first samples and the plurality of first peak reduction samples.

20 Claims, 26 Drawing Sheets

(56) References Cited

U.S. PATENT DOCUMENTS

| | | | |
|---|---|---|---|
| 7,720,175 B2* | 5/2010 | Yeon | H04L 27/2624 375/296 |
| 7,747,224 B2* | 6/2010 | McCallister | H03F 3/24 375/267 |
| 7,751,509 B1* | 7/2010 | Lehnert | H04L 5/0021 375/348 |
| 7,751,786 B2* | 7/2010 | McCallister | H03G 3/3042 455/115.2 |
| 7,778,347 B2* | 8/2010 | Chen | H04L 27/2623 375/295 |
| 7,869,767 B2* | 1/2011 | McCallister | H04B 1/0475 375/267 |
| 8,121,216 B2* | 2/2012 | Yoshida | H04B 1/76 370/335 |
| 8,259,846 B2* | 9/2012 | Liang | H04L 27/2614 455/67.11 |
| 8,355,466 B2* | 1/2013 | Kleider | H04L 27/3863 455/39 |
| 8,391,377 B2* | 3/2013 | Zhu | H04B 17/11 375/259 |
| 8,406,323 B2* | 3/2013 | Huang | H04L 27/26522 375/299 |
| 8,649,471 B1* | 2/2014 | Charbonneau | H04L 27/2624 375/295 |
| 8,711,974 B2* | 4/2014 | Kumar | H03F 1/3294 375/232 |
| 8,837,652 B2* | 9/2014 | Stern | H04L 27/2613 375/267 |
| 8,948,303 B1* | 2/2015 | Van Cai | H04L 27/2624 375/296 |
| 9,055,529 B2* | 6/2015 | Shih | H03F 3/24 |
| 9,100,253 B2* | 8/2015 | Mundarath | H04L 27/2624 |
| 9,313,078 B1* | 4/2016 | Barman | H04L 27/2624 |
| 9,521,024 B2* | 12/2016 | Wang | H04L 27/2624 |
| 9,544,171 B2* | 1/2017 | Berardinelli | H04L 27/2607 |
| 9,942,011 B2* | 4/2018 | Tang | H04L 25/03834 |
| 10,044,543 B2* | 8/2018 | Shih | H04L 27/2623 |
| 10,069,666 B2* | 9/2018 | Lin | H04L 27/2626 |
| 10,200,227 B2* | 2/2019 | Shattil | H04J 13/0003 |
| 10,212,013 B2* | 2/2019 | Qiu | H04L 27/2623 |
| 10,340,987 B2* | 7/2019 | McCallister | H04B 17/336 |
| 10,547,481 B2* | 1/2020 | Yao | H04L 27/2623 |
| 10,727,896 B2* | 7/2020 | Lv | H04B 1/0475 |
| 10,771,297 B2* | 9/2020 | Lin | H04L 27/26 |
| 11,038,731 B2* | 6/2021 | Fomin | H03F 3/24 |
| 11,121,734 B2* | 9/2021 | Jiang | H04B 1/1036 |
| 11,146,374 B2* | 10/2021 | Li | H04L 27/0014 |
| 11,356,312 B2* | 6/2022 | Nadal | H04L 27/2639 |
| 2003/0123383 A1* | 7/2003 | Korobkov | H04L 5/0037 370/208 |
| 2003/0231714 A1* | 12/2003 | Kjeldsen | H04L 27/2601 375/259 |
| 2004/0021595 A1* | 2/2004 | Erdogan | H03M 13/235 341/144 |
| 2004/0102219 A1* | 5/2004 | Bunton | H04B 5/02 455/66.1 |
| 2004/0218689 A1* | 11/2004 | Akhtman | H04L 27/2624 375/296 |
| 2004/0252781 A1* | 12/2004 | Park | H04L 5/0062 375/295 |
| 2004/0266369 A1* | 12/2004 | McCallister | H04B 1/0475 455/115.1 |
| 2004/0266372 A1* | 12/2004 | McCallister | H04B 1/0475 455/116 |
| 2005/0163248 A1* | 7/2005 | Berangi | H04B 1/0475 375/296 |
| 2005/0163252 A1* | 7/2005 | McCallister | H03F 3/24 375/296 |
| 2006/0087961 A1* | 4/2006 | Chang | H04L 27/2607 370/210 |
| 2007/0082617 A1* | 4/2007 | McCallister | H04B 1/0475 455/63.1 |
| 2007/0254592 A1* | 11/2007 | McCallister | H04B 1/0475 455/67.11 |
| 2008/0205540 A1* | 8/2008 | Takeda | H04L 5/0048 375/267 |
| 2008/0285640 A1* | 11/2008 | McCallister | H04L 25/03343 375/233 |
| 2009/0143884 A1* | 6/2009 | Chieng | H03F 3/217 375/355 |
| 2009/0156143 A1* | 6/2009 | Shute | H03G 3/3042 455/127.1 |
| 2010/0118806 A1* | 5/2010 | Griot | H04L 27/2607 370/329 |
| 2010/0265999 A1* | 10/2010 | Stern | H04L 27/26265 375/219 |
| 2011/0064162 A1* | 3/2011 | McCallister | H04L 27/2623 455/114.2 |
| 2011/0092173 A1* | 4/2011 | McCallister | H04B 1/0475 455/108 |
| 2011/0134972 A1* | 6/2011 | Zhu | H01Q 3/34 375/219 |
| 2013/0005282 A1* | 1/2013 | Zhang | H04L 25/03012 455/114.2 |
| 2013/0230121 A1* | 9/2013 | Molko | H04L 27/2623 375/295 |
| 2013/0287145 A1* | 10/2013 | Park | H04L 27/2614 375/319 |
| 2014/0044215 A1* | 2/2014 | Mundarath | H04L 27/2624 375/297 |
| 2014/0065986 A1* | 3/2014 | McCallister | H03F 1/0266 455/91 |
| 2015/0099564 A1* | 4/2015 | Shih | H04W 52/0209 455/574 |
| 2015/0200797 A1* | 7/2015 | McCallister | H04L 27/2623 370/329 |
| 2015/0304146 A1* | 10/2015 | Yang | H04L 27/26412 370/329 |
| 2015/0372843 A1* | 12/2015 | Bala | H04L 27/26538 375/295 |
| 2016/0028574 A1* | 1/2016 | Wang | H04L 27/367 375/296 |
| 2016/0198446 A1* | 7/2016 | Wild | H04L 5/0066 370/330 |
| 2016/0204822 A1* | 7/2016 | Yu | H04L 27/26416 375/219 |
| 2016/0373172 A1* | 12/2016 | Mendes | H04L 1/0057 |
| 2016/0380689 A1* | 12/2016 | Sun | H04L 25/03159 370/330 |
| 2017/0033964 A1* | 2/2017 | Shih | H04L 27/2624 |
| 2017/0070258 A1* | 3/2017 | Shih | H04B 1/525 |
| 2017/0331599 A1* | 11/2017 | Tang | H04L 27/2626 |
| 2019/0173702 A1* | 6/2019 | Lanoiselee | H04L 27/2605 |
| 2019/0229760 A1* | 7/2019 | Jiang | H04W 88/085 |
| 2019/0273536 A1* | 9/2019 | McCallister | H04L 27/2634 |
| 2020/0204418 A1* | 6/2020 | Fomin | H04L 25/03834 |
| 2023/0016762 A1* | 1/2023 | Shih | H04L 27/02 |
| 2023/0344695 A1* | 10/2023 | Shih | H04L 27/2624 |

\* cited by examiner (a) Peak Reduction (b) CFR waveform (c) CFR Spectrum Analysis (a) Peak Reduction (b) Window Length vs. ACLR/EVM (c) ACLR Performance (a) Peak Reduction (b) Sample rate vs. ACLR/EVM (c) ACLR Performance (a) Block diagram of 40-Taps (b) Block diagram of 160-Taps (c) Spectrum Analysis (a) Block diagram of 40-Taps (b) Block diagram of 320-Taps (c) Spectrum Analysis (a) CFR Block diagram (b) Up-Sampling with DUC

MULTI-RATE CREST FACTOR REDUCTION

PRIORITY CLAIM

This application is a national phase filing under section 371 of PCT Application No. PCT/US2020/018423, filed on Feb. 14, 2020 and entitled "Multi-Rate Crest Factor Reduction," which is hereby incorporated by reference herein as if reproduced in its entirety.

TECHNICAL FIELD

The present disclosure relates to wireless communication, and more specifically to improve efficiency and/or linearity of transmitters.

BACKGROUND

In a communication system, a crest factor of a signal may represent a ratio of peak values to the effective value of the signal. In some cases, a crest factor may be calculated by dividing the peak amplitude of a signal by the root mean square of the signal. Therefore, the crest factor may indicate a peak-to-average power ratio of the signal. A signal with a high crest factor may distort the linearity of a power amplifier in a transmitter. Therefore, in some cases, a transmitter may reduce the crest factor of a signal before transmitting the signal.

SUMMARY

The present disclosure is directed to methods and systems for reducing crest factors.

In a first implementation, a method for reducing crest factors includes: receiving plurality of first samples of a first input signal, wherein the plurality of first samples are generated at a first sampling rate; performing a first peak detection based on the plurality of first samples to generate a plurality of first peak detection output samples; downsampling the plurality of first peak detection output samples to generate a plurality of first windowing input samples at a second sampling rate; generating a plurality of first windowing output samples based on the plurality of first windowing input samples; upsampling the plurality of first windowing output samples to generate a plurality of first peak reduction samples at the first sampling rate; and generating a first output signal based on the plurality of first samples and the plurality of first peak reduction samples.

In a second implementation, an electronic device includes: a non-transitory memory storage comprising instructions, and one or more hardware processors in communication with the memory storage, wherein the one or more hardware processors execute the instructions to: receive a plurality of first samples of a first input signal, wherein the plurality of first samples are generated at a first sampling rate; perform a first peak detection based on the plurality of first samples to generate a plurality of first peak detection output samples; downsample the plurality of first peak detection output samples to generate a plurality of first windowing input samples at a second sampling rate; generate a plurality of first windowing output samples based on the plurality of first windowing input samples; upsample the plurality of first windowing output samples to generate a plurality of first peak reduction samples at the first sampling rate; and generate a first output signal based on the plurality of first samples and the plurality of first peak reduction samples.

In a third implementation, a non-transitory computer-readable medium storing computer instructions for reducing crest factor, that when executed by one or more hardware processors, cause the one or more hardware processors to perform operations including: receiving a plurality of first samples of a first input signal, wherein the plurality of first samples are generated at a first sampling rate; performing a first peak detection based on the plurality of first samples to generate a plurality of first peak detection output samples; downsampling the plurality of first peak detection output samples to generate a plurality of first windowing input samples at a second sampling rate; generating a plurality of first windowing output samples based on the plurality of first windowing input samples; upsampling the plurality of first windowing output samples to generate a plurality of first peak reduction samples at the first sampling rate; and generating a first output signal based on the plurality of first samples and the plurality of first peak reduction samples.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION OF ILLUSTRATIVE EMBODIMENTS

The following detailed description describes multi-rate crest factor reduction for improving efficiency and/or linearity of transmitters and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

In some cases, a crest factor reduction (CFR) algorithm may be used to reduce the dynamic range of a signal that has a high Peak to Average Power Ratio (PAPR). Reducing the crest factor of a signal can improve the linearity of the radio frequency (RF) power amplifier in a transmitter. In some cases, multi-stage CFR algorithms can be used to reduce the PAPR of a transmission signal. However, a multi-stage CFR algorithm may use variable parameters for signals with different bandwidth.

Figure 1:
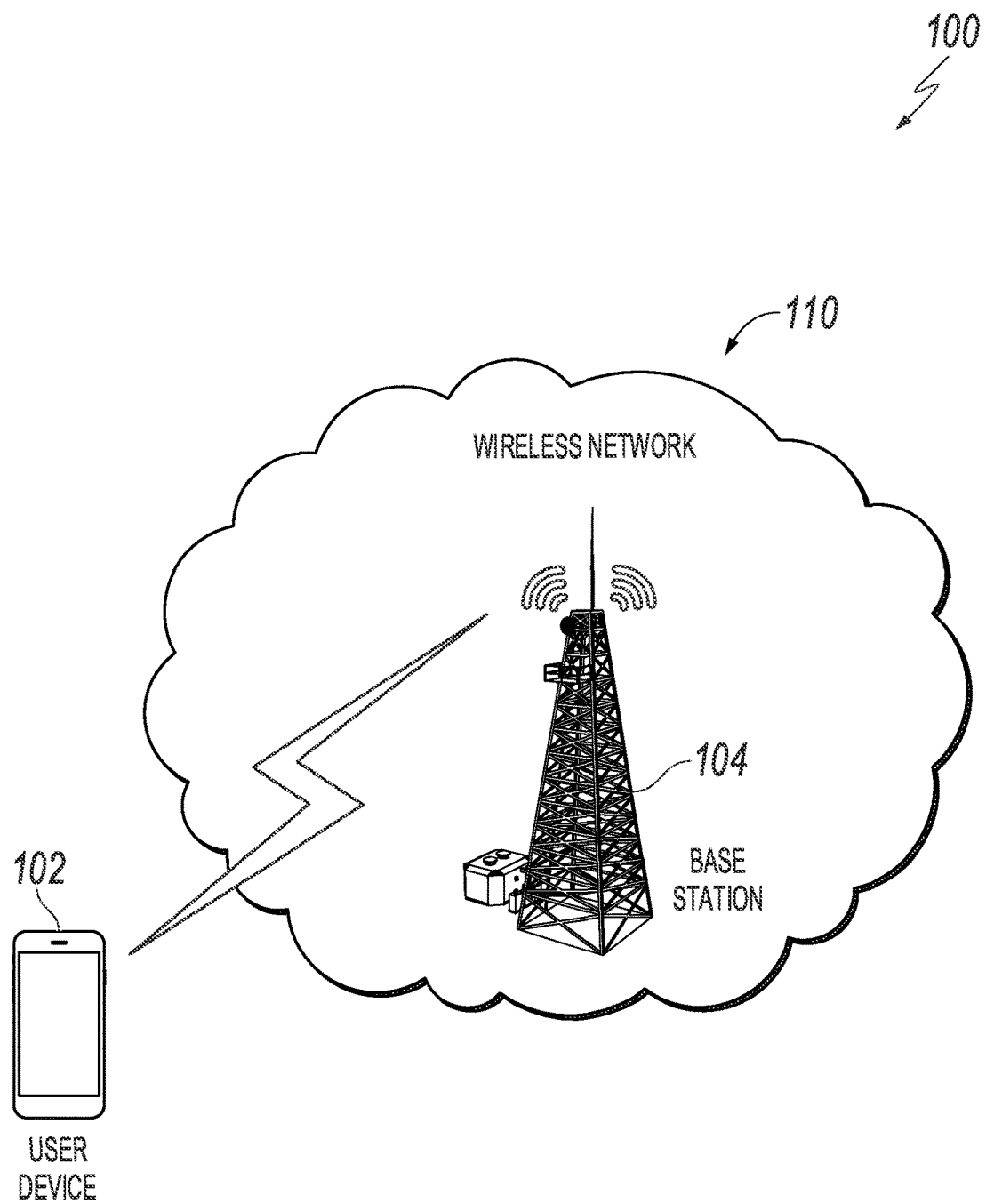
FIG. 1 is an example wireless communication system that reduces crest factors according to an implementation.

FIG. 1 is an example wireless communication system wo that reduces crest factors according to an implementation. For example, an input signal may be received. The input signal may include a clipping signal that reduces a peak amplitude of a source signal based on a predetermined clipping level. The input signal may be transposed to a plurality of transposed signals using a plurality of multipliers. In some cases, each of the plurality of multipliers may have a windowing function coefficient, and each of the plurality of transposed signals may be generated by multiplying the input signal with the respective windowing function coefficient of each of the plurality of the multipliers. In some cases, at least one of the plurality of multipliers may be implemented using canonic signed digit (CSD) arithmetic. In some cases, at least one of the plurality of multipliers may be implemented using a multiplication function unit. A feedback signal may be generated based on the plurality of transposed signals using a first plurality of delay taps. A windowing signal may be generated based on the feedback signal. The windowing signal may reduce a crest factor of the source signal. In some cases, a forward path signal may be generated using the plurality of transposed signals, the first plurality of delay taps, and a second plurality of delay taps. In some cases, the windowing signal may be generated based on the forward path signal. In some cases, an output signal may be generated based on the windowing signal and the source signal.

Reducing crest factors according to methods and systems described herein may provide one or more advantages. For example, transposing the signal before passing the signal through the delay taps may reduce the delay created in the critical path of the finite impulse response (FIR) filter. In addition, using a folding structure may reduce the number of multipliers in the FIR filter and therefore reduces implementation complexity of the filter. Furthermore, using CSD arithmetic may replace multiplication function units with addition and subtraction function units, and therefore reduces the delay and the implementation complexities of the filter. Reducing the delay may improve the speed performance of the FIR filter and enable the filter to be used to process a broadband signal that has a stringent delay requirement.

At a high level, the example wireless communication system 100 includes a user device 102 and a wireless communication network no, which includes a base station 104 that is configured to communicate with the user device 102. In the illustrated example, the user device 102 may perform a CFR operation on an uplink signal before transmitting the uplink signal to the base station 104. Similarly, the base station 104 may perform a CFR operation on a downlink signal before transmitting the downlink signal to the user device 102.

For example, the user device 102 may include a windowing signal generator. A windowing signal generator may include one or more hardware circuit elements, software, or a combination thereof that can be configured to create a signal waveform with window shaping. The windowing signal generator may receive an input signal. The input signal may include a clipping signal that reduces a peak amplitude of a source signal based on a predetermined clipping level. In some cases, the source signal may be a signal whose crest factor will be reduced before being transmitted. The input signal may be transposed to a plurality of transposed signals using a plurality of multipliers.

A feedback signal may be generated based on the plurality of transposed signals using a first plurality of delay taps. A windowing signal may be generated based on the feedback signal. In some cases, the user device 102 may use the windowing signal and the input signal to generate an output signal. The output signal has a reduced crest factor. The user device 102 may transmit the output signal using a transmit antenna.

Similarly, the base station 104 may also include a windowing signal generator that generates a windowing signal as discussed above. The base station 104 may use the windowing signal and the input signal to generate an output signal that has a reduced crest factor. The base station 104 may transmit the output signal using a transmit antenna.

Turning to a general description of the elements, a user device may be referred to as a mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a user device include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "user device" can also refer to any hardware or software component that can terminate a communication session for a user.

The wireless communication network no may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station 104. A base station 104 may be a radio base station that may control all or at least some radio-related functions in a fixed part of the system. The base station 104 may provide radio interface within their coverage area or a cell for the user device 102 to communicate. The base station 104 may be distributed throughout the cellular network to provide a wide area of coverage. The base station 104 directly communicates to one or a plurality of user devices, other base stations, and one or more core network nodes.

While described in terms of FIG. 1, the present disclosure is not limited to such an environment. The base station 104 may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication systems include IEEE 802.11 wireless local area network, IEEE 802.16 WiMAX network, and others.

While elements of FIGS. 1-26 are shown as including various component parts, portions, or modules that implement the various features and functionality, nevertheless these elements may instead include a number of submodules, third-party services, components, libraries, and such, as appropriate. Furthermore, the features and functionality of various components can be combined into fewer components as appropriate.

Figure 2:
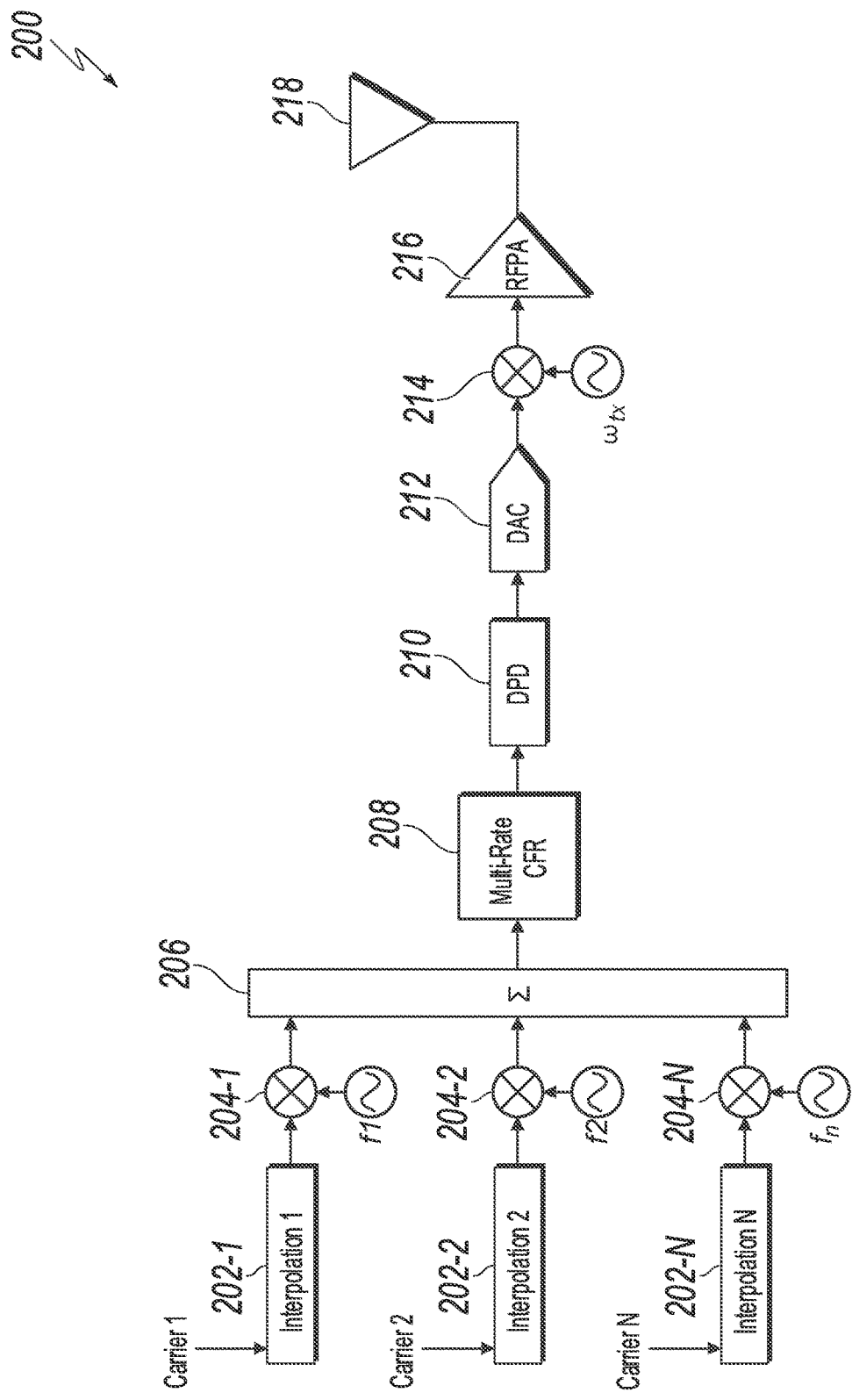
FIG. 2 is a schematic diagram illustrating an example carrier aggregation transmitter according to an implementation.

FIG. 2 is a schematic diagram illustrating an example carrier aggregation transmitter 200 according to an implementation. In some cases, the carrier aggregation transmitter 200 can be used to apply a crest factor reduction (CFR) algorithm to reduce peak-to-average power ratio (PAPR) of a modulation signal and work with digital pre-distortion (DPD) to improve linearity/efficiency of radio frequency power amplifier (RFPA) with better adjacent channel leakage ratio (ACLR) and lower cost and power consumption. As illustrated, the carrier aggregation transmitter 200 includes interpolators 202-1~N, multipliers 204-1~N, a summation function unit 206, a CFR component 208, a DPD component 210, a digital-to-analog converter (DAC) 212, a multiplier 214, a RFPA 216, and an antenna 218. In some cases, the CFR component 208 can be used to reduce PAPR of the signal so that the DPD component 210 can linearize RFPA 216 under a dynamic range.

Figure 3:
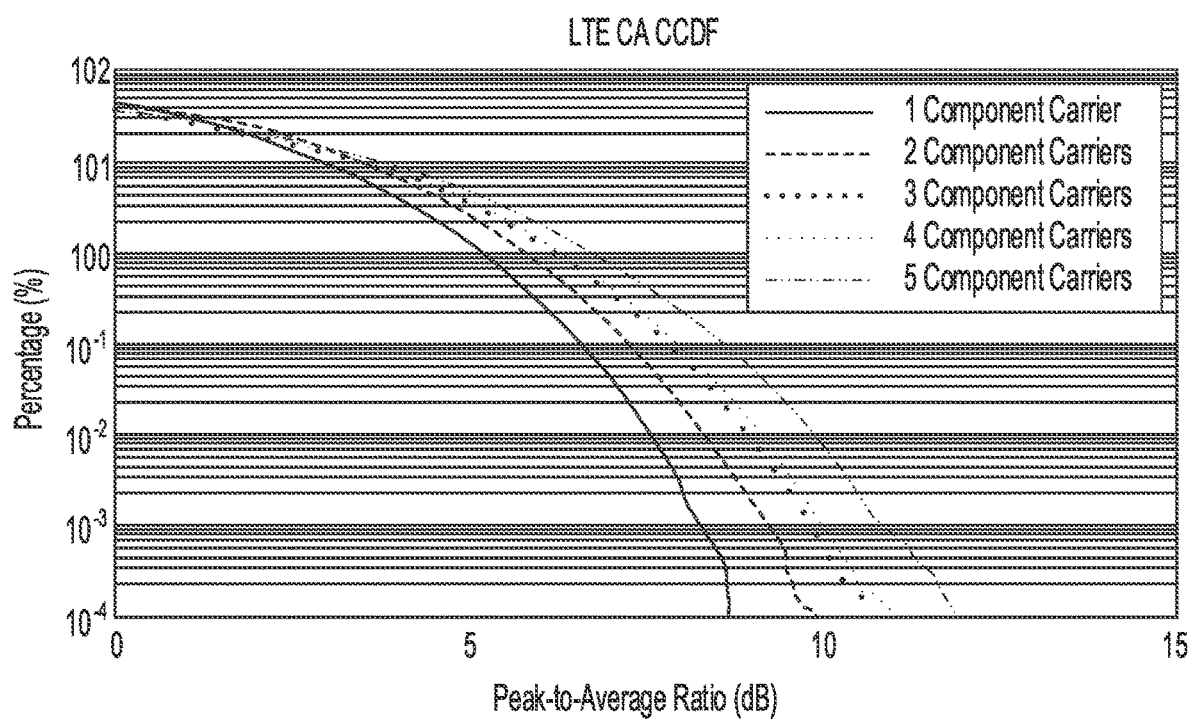
FIG. 3 is a graph showing a carrier aggregation signal characterization of an example carrier aggregation transmitter according to an implementation.

In some cases, the carrier aggregation in the carrier aggregation transmitter 200 can improve the throughput of the communication. However, in some cases, the carrier aggregation may lead to a high PAPR problem. For example, the PAPR may increase with the number of carriers and thus degrade RFPA efficiency and linearity. FIG. 3 is a graph showing a carrier aggregation signal characterization of an example carrier aggregation transmitter (e.g., carrier aggregation transmitter 200). Specifically, FIG. 3 illustrates a complementary cumulative distribution function (CCDF) curve of signals for different numbers of carriers from one to five, where the horizontal axis is scaled to dB above the average signal power, which means that the peak-to-average ratios as opposed to absolute power level is being measured. The vertical axis is the percentage of time the signal spends at or above the power level specified by the horizontal axis. As shown, the PAPR of the signal increases with the number of the carriers. To meet linearity requirements, RFPA may consume more power while operating with high PAPR. This may lead to lower efficiency problem and reduce battery lifetime. Furthermore, the maximal linear output power may be reduced with high PAPR and the coverage range may shrink, which can increase the dropped-call rate (DCR) of communication.

Figure 4:
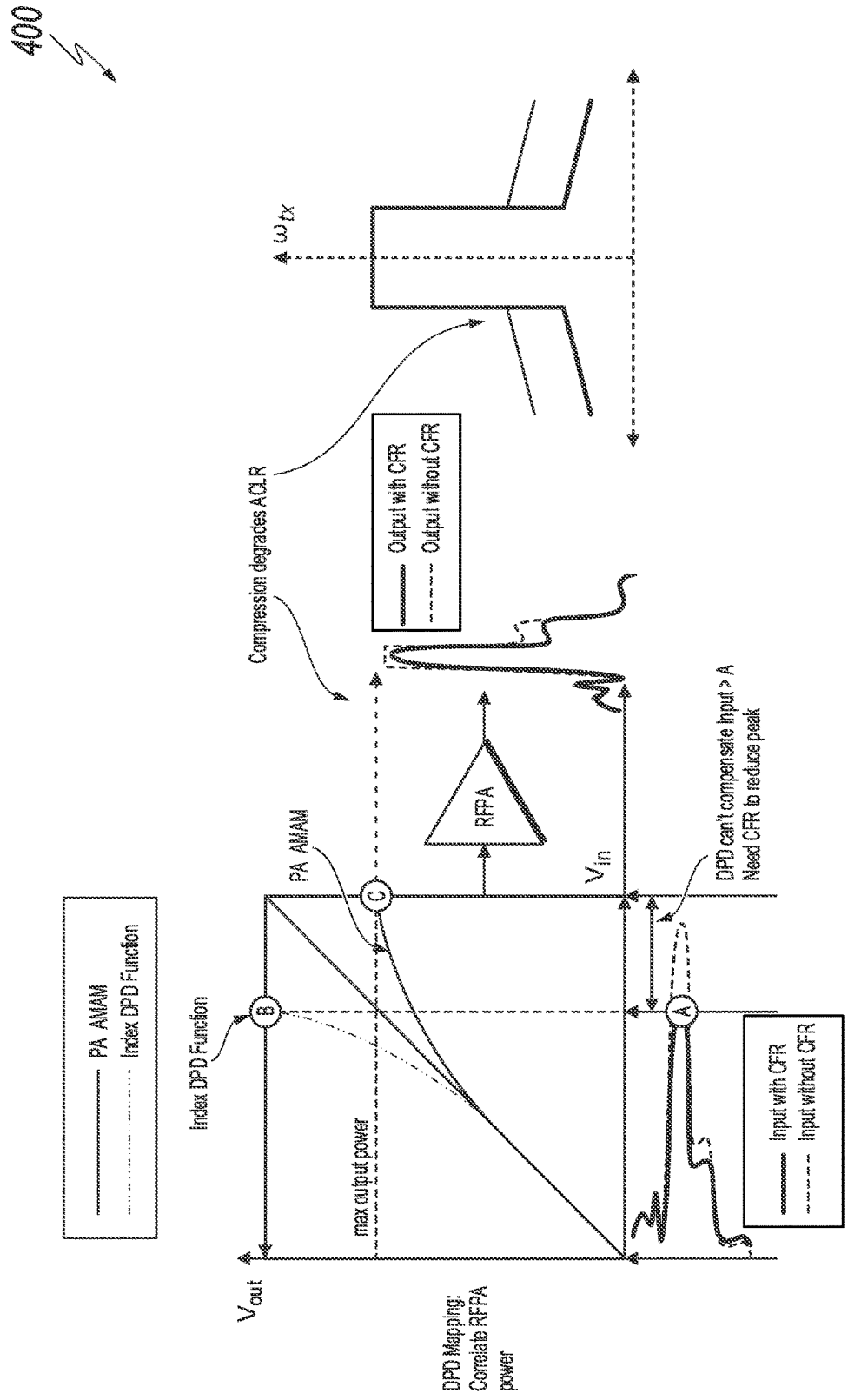
FIG. 4 is a graph showing an example crest factor reduction (CFR) and digital predistortion (DPD) co-operation algorithm according to an implementation.

In some cases, CFR can be used to reduce PAPR of a modulation signal and work with DPD to improve RFPA performance. FIG. 4 is a graph showing an example CFR and DPD co-operation algorithm. As shown, a power amplifier amplitude to amplitude modulation (PA AMAM) characterization, an index DPD function, input signals (with and without CFR), and output signals (with and without CFR) are illustrated on the left side. In an example DPD operation, the pre-distortion signal of the input at A can index B from the DPD function. DPD mapping can be used to invoke the RFPA output power at C, which is the maximal RFPA output power. In some cases, compression/clipping may occur when input amplitude is greater than A since the associated pre-distortion power is greater than the maximum output power. As shown by the clipping waveform represented by frequency response cot, (y-axis is the magnitude of frequency) on the right side of the figure, the DPD will not compensate such distortion (e.g., the compressed/clipped waveform). The ACLR performance, therefore, can be limited by the compression/clipping. The RFPA efficiency and linearity may also be degraded. To reduce the low performance and low efficiency problems, peaks of the input amplitude can be required to be lower than A. In some cases, CFR can be used to reduce the magnitude of the peaks to be lower than A to enhance DPD performance and reduce the PAPR. With low PAPR of the modulation signal, RFPA can operate at higher output power region and enhance the transmitter coverage.

Figure 5:
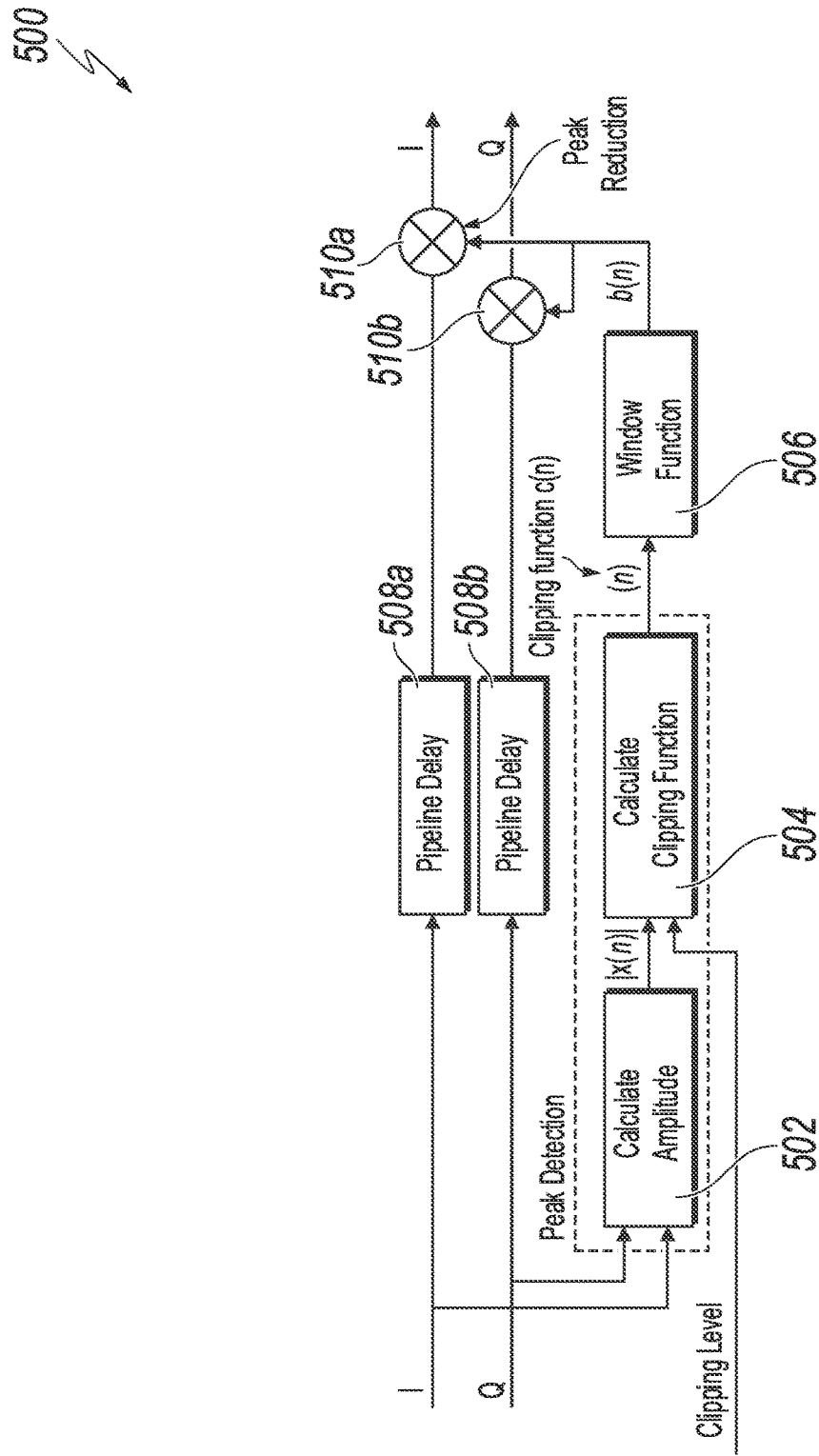
FIG. 5 is a schematic diagram illustrating an example CFR component according to an implementation.

FIG. 5 is a schematic diagram illustrating an example CFR component 500 according to an implementation. In some cases, the CFR component 500 can be used in a transmitter, e.g., in the user device 102 or in the base station 104 or in the transmitter 200, to reduce the peak amplitude of a source signal x(n). As illustrated, the CFR component 500 includes an amplitude calculator 502, a clipping signal generator 504, and a windowing signal generator 506. The amplitude calculator 502, the clipping signal generator 504, and the windowing signal generator 506 can be used to generate a windowing signal b(n) based on the source signal x(n) and a clipping level. The CFR component 500 also includes pipeline delay registers 508a-b and multipliers 510a-b that are used to mix the source signal x(n) with the windowing signal b(n) to generate an output signal y(n) that has a reduced crest factor.

As illustrated, the I and Q components of the source signal x(n) pass through the amplitude calculator 502 to generate the amplitude level |x(n)| of the source signal x(n). In some cases, the amplitude calculator 502 may include one or more hardware circuit elements, software, or a combination thereof that can be configured to generate an amplitude level of a signal.

In some cases, the clipping signal generator 504 may include one or more hardware circuit elements, software, or a combination thereof that can be configured to generate a clipping signal. As illustrated, the clipping signal generator 504 receives the amplitude level |x(n)| and a clipping level to generate a clipping signal c(n). In some cases, the clipping level represents a predetermined peak value for the output signal y(n). In some cases, the clipping signal c(n) represents a scaling function, which may scale down the components in the source signal x(n) that are above the clipping level.

The following equation represents an example clipping signal c(n).

$$c(n) = \begin{cases} 1, & |x(n)| \leq \text{Clipping Level} \\ \dfrac{\text{Clipping Level}}{|x(n)|}, & |x(n)| > \text{Clipping Level} \end{cases}.$$

In some cases, for example, in a hard-clipping CFR algorithm, the source signal x(n) is multiplied with the clipping signal c(n) to generate an output signal. However, the output signal produced in the hard clipping CFR algorithm may include an increased out-of-band signal level. This may be referred to as adjacent channel power re-growth problems. Because the out-of-band signal level is increased, the noise floor of the output signal is degraded. In some cases, an output signal with increased out-of-band signal level may fail an out-of-band emission mask requirement specified by a radio access technology standard, and therefore cannot be transmitted in the corresponding wireless communication system.

In some cases, a windowing signal may be used to reduce the adjacent channel power re-growth effects. In some cases, as illustrated in FIG. 5, the windowing signal generator 506 may receive the clipping signal c(n) and generate the windowing signal b(n) based on the clipping signal c(n). In some cases, the windowing signal generator may be implemented using a finite impulse response (FIR) filter. The FIR filter may include N windowing function units. Each of the windowing function unit may have a windowing function coefficient. The windowing function coefficient may be denoted as $W_0, W_1, W_2, \ldots, W_{N-1}$, where N represents the order of the FIR filter. In some cases, the order of the FIR filter denotes the number of windowing function units used in the FIR filter. The following equation represents an example windowing signal b(n):

$$b(n) = 1 - \sum_{k=-\infty}^{\infty} [1 - c(n)] w(n - k)$$

In the above equation, b(n) is the output of the clipping signal after windowing process, c(n) is the clipping function determined by a threshold level, and w(n-k) is the window function. In some cases, the window function may be generated by the Hamming or Hanning function.

As illustrated, the source signal x(n) passes through pipeline delay registers 508a-b, and feed into the multipliers 510a-b, respectively. The multipliers 510a-b multiply the delayed source signals with a windowing signal b(n) to generate output signal y(n). The output signal has a reduced crest factor compared to the source signal x(n). The following equation represents an example output signal y(n):

$$y(n) = x(n) b(n).$$

Figure 6:
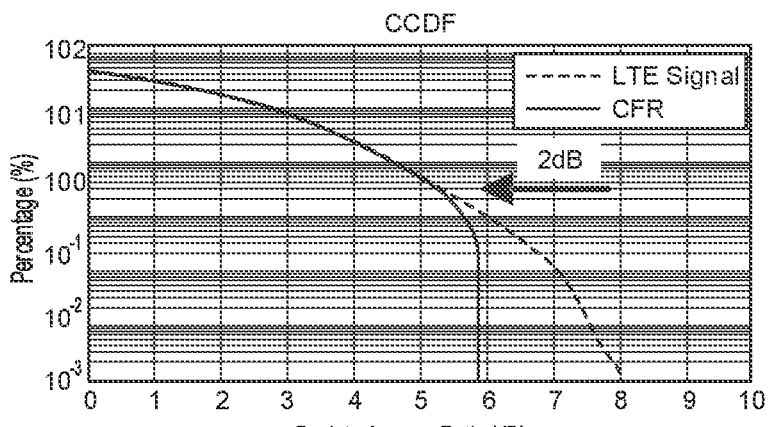
FIG. 6 shows performance of an example CFR component according to an implementation.
Figure 6:
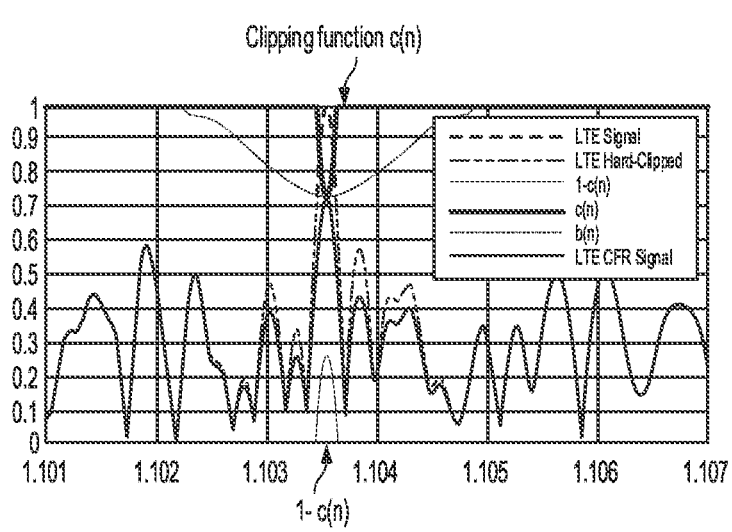
Figure 6:
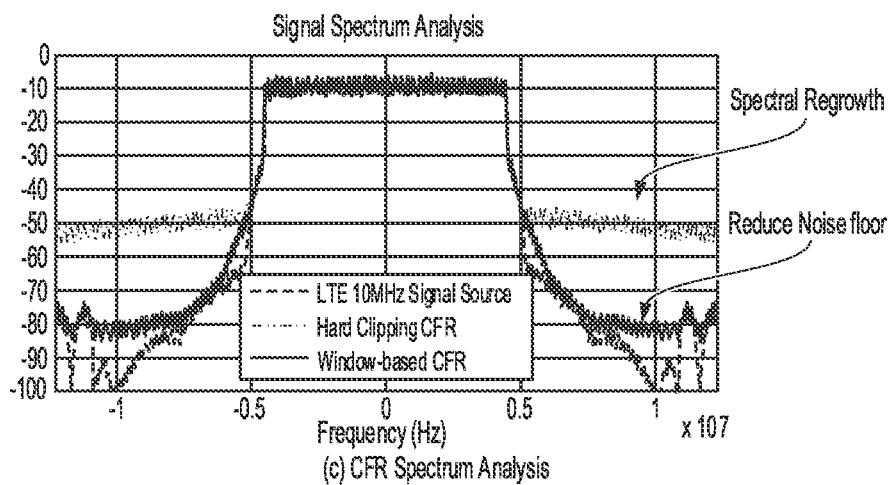

In some cases, the windowing-based CFR algorithm can provide peak reduction with ACLR improvement. FIG. 6 shows performance of an example CFR component. Graph (a) of FIG. 6 shows the CCDF curve of an LTE signal with and without CFR. As shown, the PAPR has been reduced by 2 dB after peak reduction. Graph (b) of FIG. 6 shows the CFR waveform. Graph (c) of FIG. 6 shows that the ACLR after peak reduction has been improved.

Figure 7:
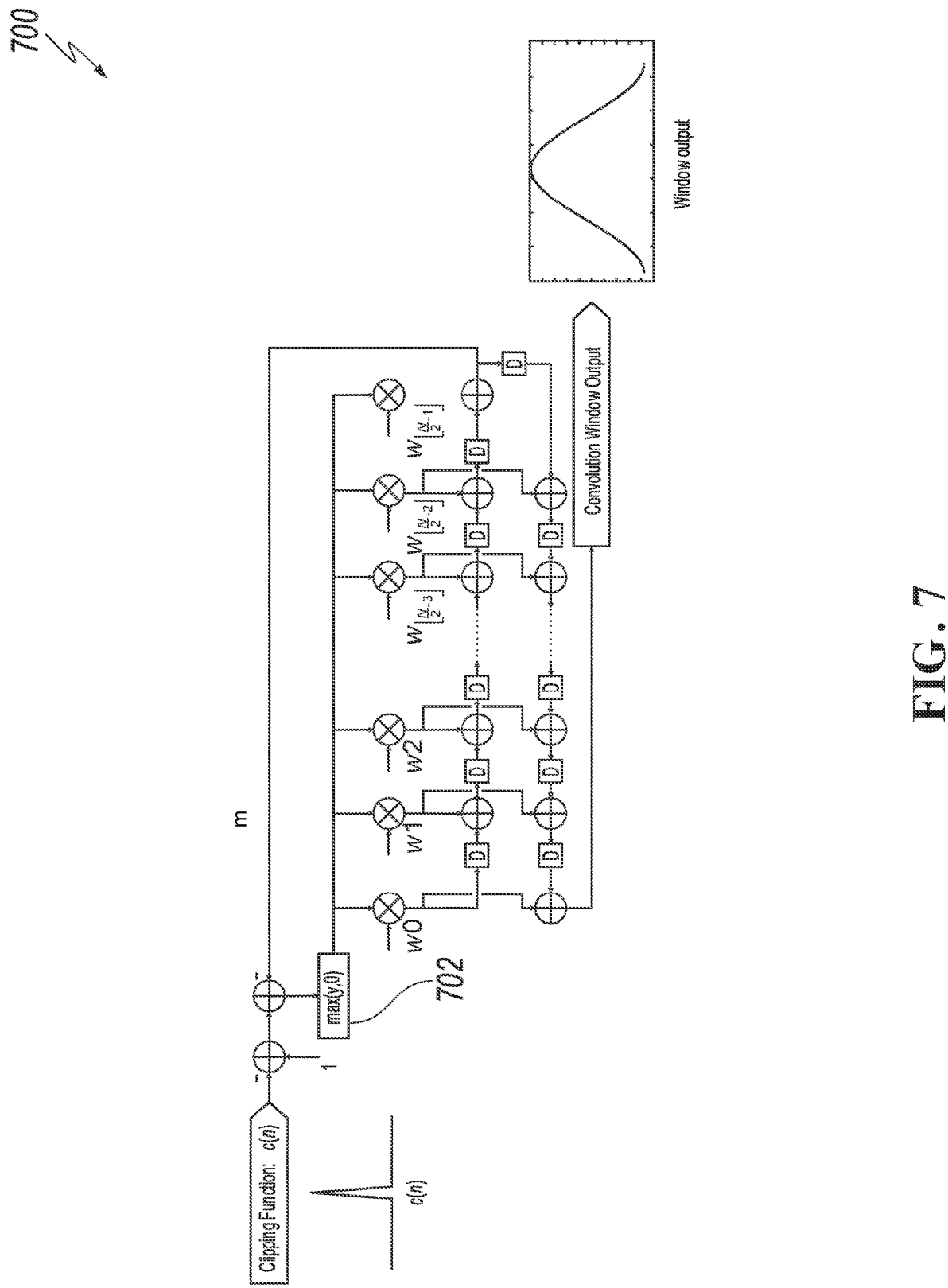
FIG. 7 is a schematic diagram illustrating an example windowing signal generator according to an implementation.

FIG. 7 is a schematic diagram illustrating an example windowing signal generator 700 (e.g., windowing signal generator 506 of FIG. 5) according to an implementation. As shown, the windowing signal generator 700 receives an input signal c(n) and generates a convolution window output. In some cases, the windowing signal generator 700 includes a comparator 702 that is configured to compare input signals. In operation, the input signal c(n) is multiplied by −1, and added to 1 to generate a signal 1−c(n). A feedback signal m is multiplied by −1 and added to the signal 1−c(n) to generate an input signal to comparator 702. The comparator 702 outputs a signal that is either the input signal or 0.

In the illustrated example, N represents the order of the windowing signal generator 700. As illustrated, the windowing signal generator 700 includes N/2 windowing function units. In some cases, each of the windowing function units may be implemented as a multiplier that multiplies a signal with a windowing function coefficient. In operation, each windowing function unit receives a signal outputted from the comparator 702 and transposes the signal into a transposed signal. In some cases, the windowing function unit may transpose the signal by multiplying the signal with its windowing coefficient. As illustrated, the windowing signal generator 700 also includes N delay taps (D). The transposed signals pass through half of the N delay taps to generate the feedback signal m. Using a transposed structure reduces the delay created in the feedback path because the critical path remains the same while the number of delay taps increases. This approach increases the speed performance of the windowing signal generator 700 and enables the windowing signal generator 700 to process signals with a high sampling rate.

Figure 8:
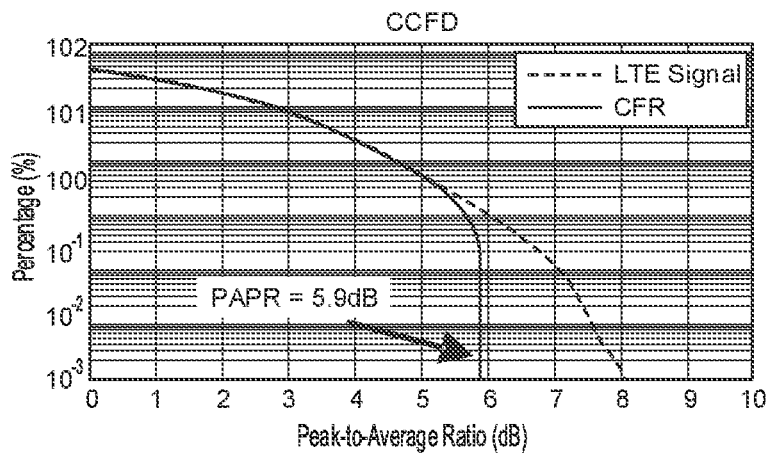
FIG. 8 shows CFR performance of an example CFR component with respect to window length of the example CFR component according to an implementation.
Figure 8:
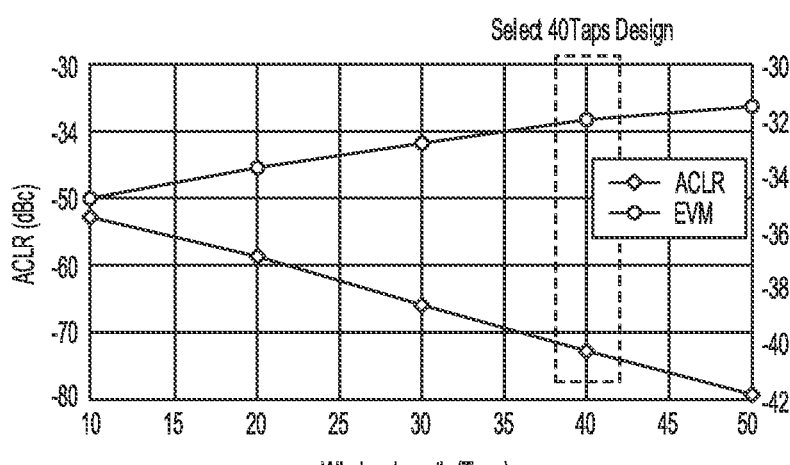
Figure 8:
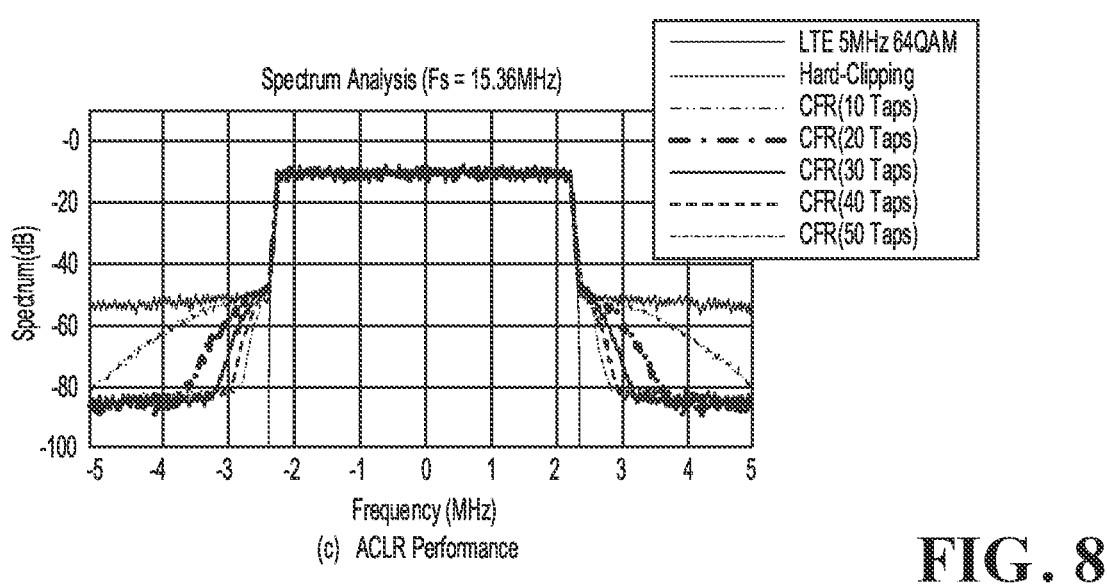

In some cases, the CFR performance changes with window length of the windowing signal generator (e.g., windowing signal generator 700) at a fixed sampling rate. In some cases, the window length may be determined based on the number of delay taps in the windowing signal generator. FIG. 8 shows CFR performance of an example CFR component with respect to window length of the example CFR component. Graph (a) of FIG. 8 shows that a PAPR of 5.9 dB is obtained and the PAPR is reduced by approximately 2 dB after peak reduction with a window length of 40 taps. Graph (b) of FIG. 8 shows that ACLR is improved (e.g., reduced) when window length is increased, and that error vector magnitude (EVM) is degraded (e.g., increased) when window length is increased. Graph (c) of FIG. 8 shows the ACLR performance for CFR with different window lengths (e.g., 10/20/30/40/50 delay taps) at a fixed sampling rate (e.g., 15.36 MHz). As shown, the ACLR is improved as the number of delay taps increases.

Figure 9:
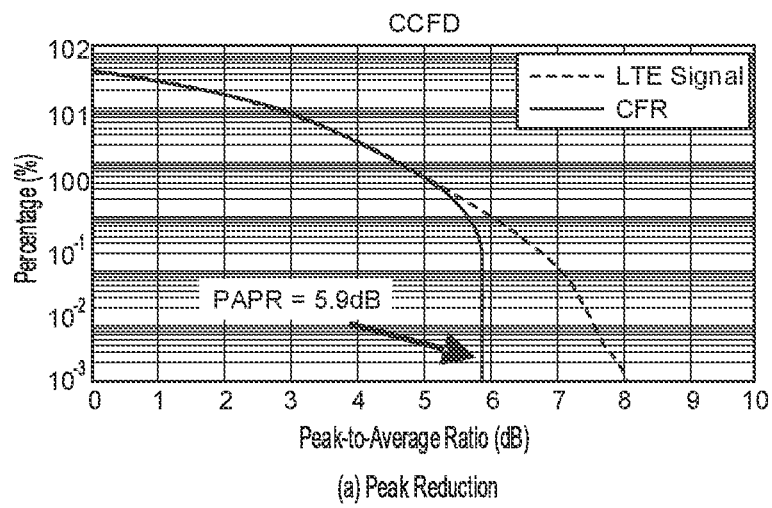
FIG. 9 shows CFR performance of an example CFR component with respect to sampling rate of the example CFR component according to an implementation.
Figure 9:
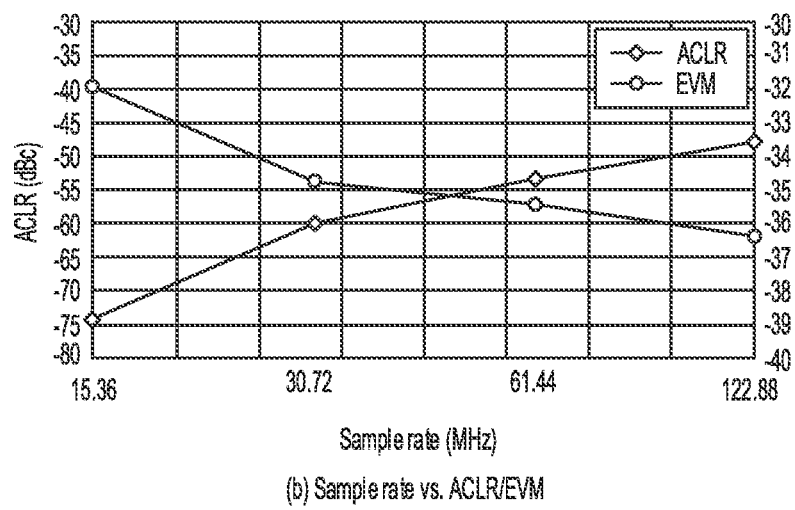
Figure 9:
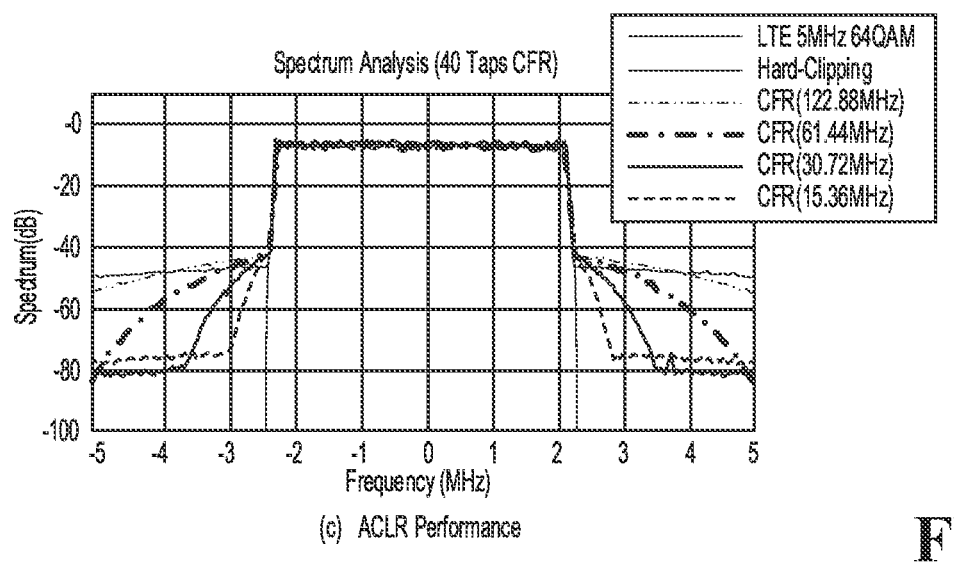

In some cases, the CFR performance changes with sampling rate at a fixed window length. FIG. 9 shows CFR performance of an example CFR component with respect to sampling rate of the example CFR. As shown, ACLR degraded when the CFR operates at higher sampling rate. To obtain EVM<−32 dB, CFR with 40 taps is selected for the sampling rate vs. performance study. Graph (a) of FIG. 9 shows that a PAPR of 5.9 dB is obtained and the PAPR is reduced by approximately 2 dB after peak reduction with a window length of 40 taps. Graph (b) of FIG. 9 shows that ACLR is degraded (e.g., increased) when sampling rate is increased, and that EVM is improved (e.g., decreased) when sampling rate is increased. Graph (c) of FIG. 9 shows the ACLR performance for CFR with different sampling rates (e.g., 15.36/30.72/61.44/122.88 MHz) at a fixed window length (e.g., 40 delay taps). As shown, the lowest sampling rate 15.36 MHz provides the best ACLR performance (e.g., lowest ACLR) among the four sampling rates.

Figure 10:
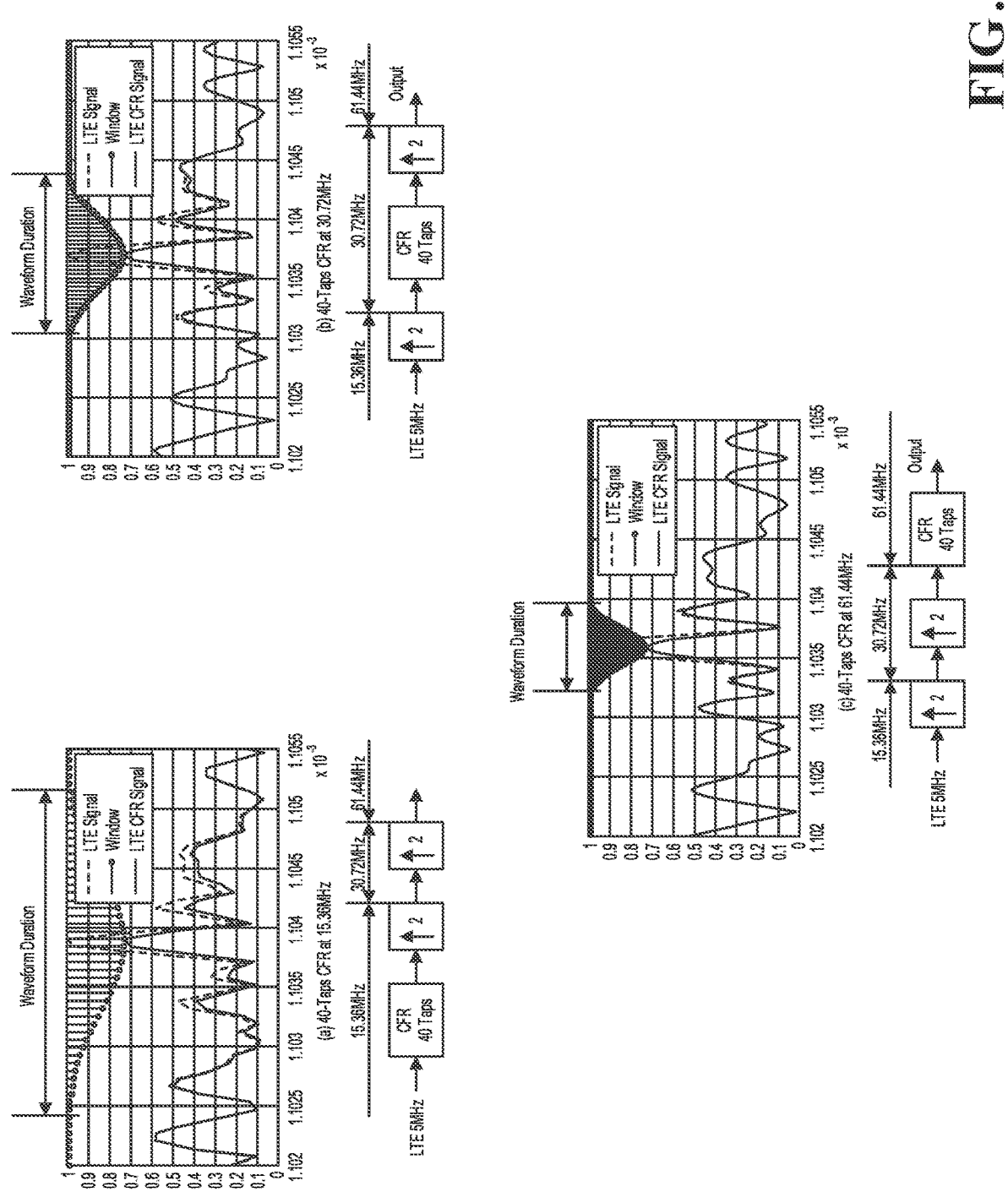
FIG. 10 shows CFR waveforms at different sampling rates according to an implementation.

FIG. 10 shows CFR waveforms at different sampling rates with fixed number of delay taps (e.g., 40 delay taps). As shown, graph (a) of FIG. 10 shows a waveform for 40-tap CFR at 15.36 MHz. As shown, two upsamplings, each with a factor of 2, are performed after the 40-tap CFR. Graph (b) of FIG. 10 shows a waveform for 40-tap CFR at 30.72 MHz. As shown, a first upsampling is performed by a factor of 2 before the 40-tap CFR, and a second upsampling is performed by a factor of 2 after the 40-tap CFR. Graph (c) of FIG. 10 shows a waveform for 40-taps CFR at 61.44 MHz. As shown, two upsamplings, each with a factor of 2, are performed before the 40-tap CFR. The window waveform duration decreases as sampling rate at which the CFR performs increases from (a) to (c).

Figure 11:
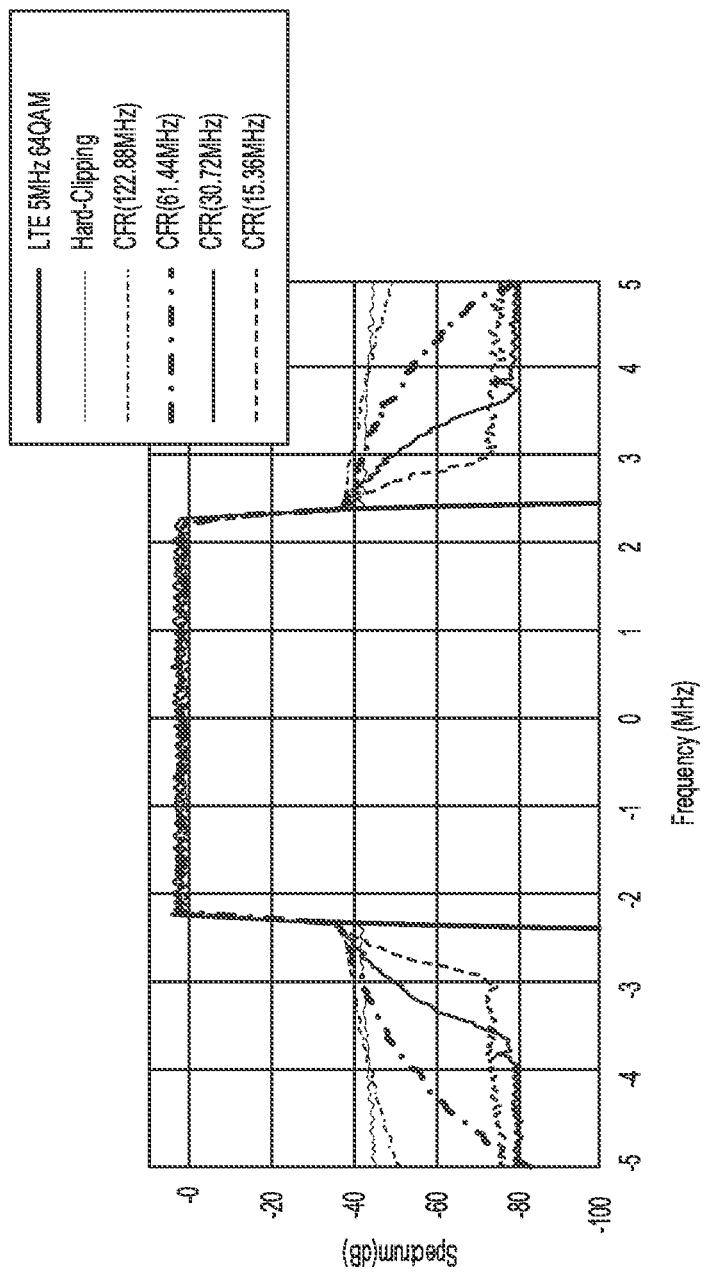
FIG. 11 is a graph illustrating an example spectrum analysis for CFR at different sampling rates according to an implementation.

In some cases, the window waveform duration determines the ACLR. In an example where CFR with fixed 40 taps is used for peak reduction, the window duration can be determined as (1/sample rate)*40 taps. In this example, the window duration decreases when the sample rate increases. In some cases, the ACLR performance improves when the window duration increases. The ACLR performance, therefore, decreases as sampling rate increases. FIG. 11 is a graph illustrating an example spectrum analysis for CFR at different sampling rates. As shown, the ACLR performance degrades with increased sampling rate. In some cases, when CFR operates at high sampling rate, high order window FIR may be needed to improve the ACLR performance. However, this may require huge silicon resource to achieve targeting performance.

Figure 12:
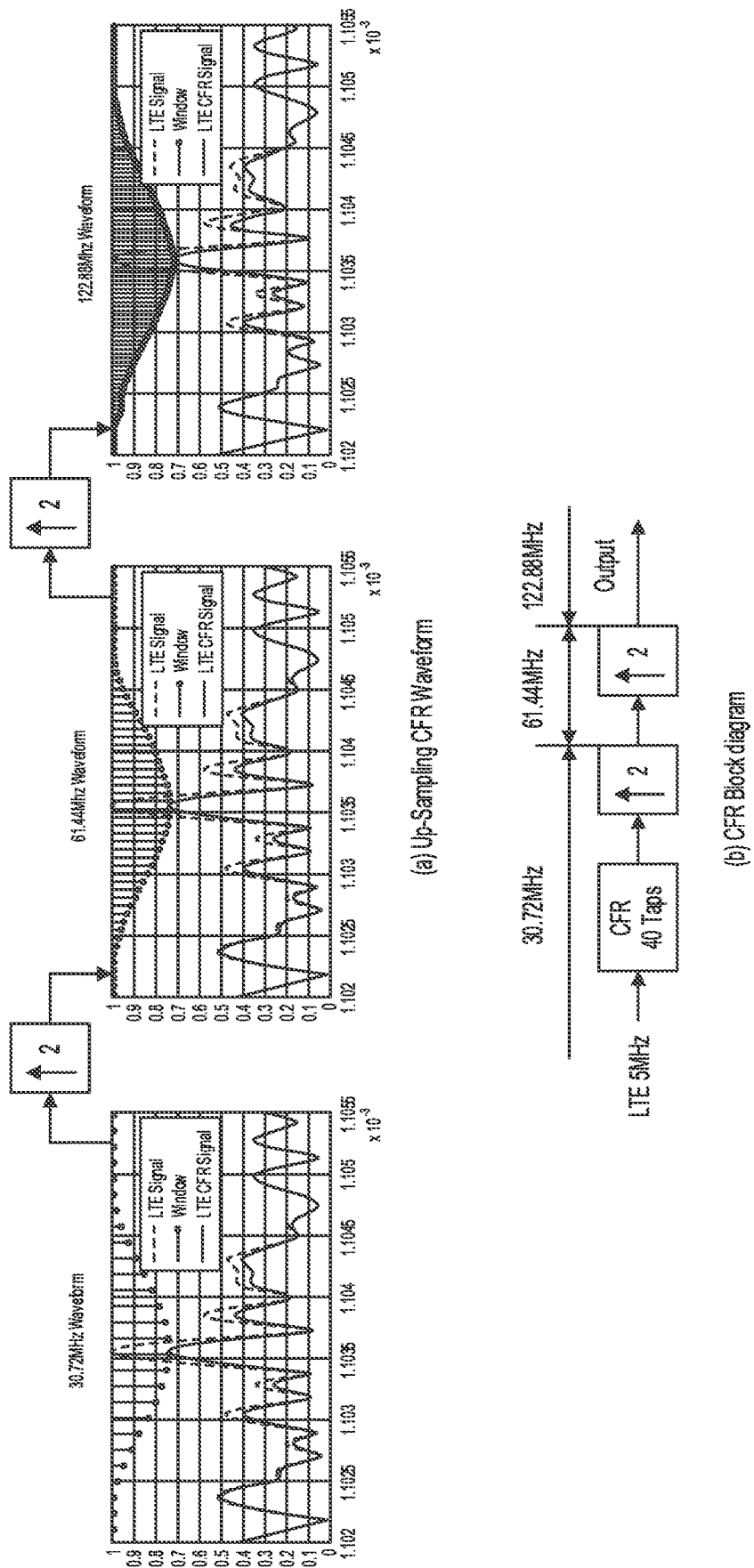
FIG. 12 shows an example CFR with upsampling according to an implementation.

In some cases, the windowing function of CFR can operate at a low sampling rate. The output signal of the CFR can then be upsampled to a high sampling rate to match the interpolated sampling rate of the input signal. Such an operation can reduce the length of windowing function while maintaining the ACLR performance. Operating the windowing function at a low sampling rate and upsampling the output signal of the windowing function can reduce the length of taps of the windowing function and thus reduces the implementation complexity of the windowing function. FIG. 12 shows an example CFR with upsampling. Graph (a) of FIG. 12 shows CFR waveforms in an example upsampling process. Graph (b) of FIG. 12 is a block diagram illustrating an example CFR with up-sampling.

Figure 13:
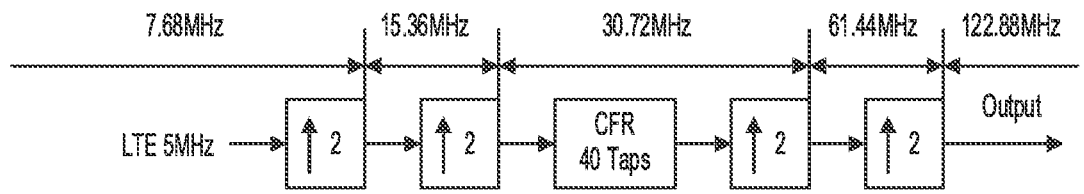
FIG. 13 shows an example upsampling CFR with a first upsampling ratio according to an implementation.
Figure 13:
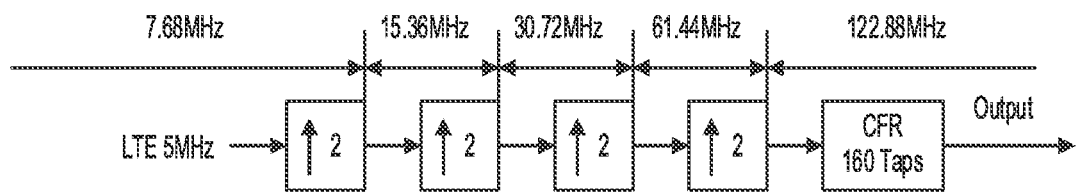
Figure 13:
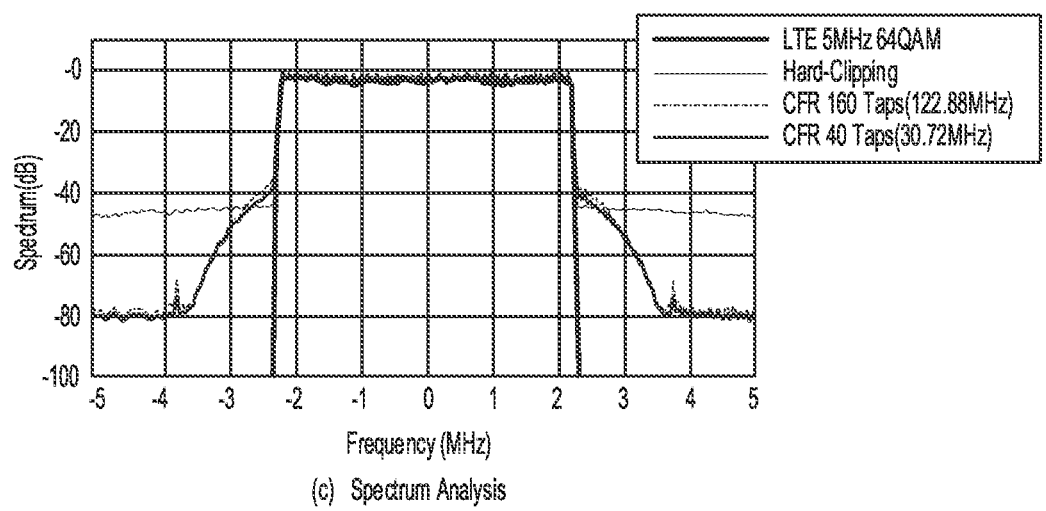

In some cases, CFR with small window length after up-sampling can deliver similar ACLR as CFR with large window length. FIG. 13 shows an example upsampling CFR with a first upsampling ratio according to an implementation. Graph (a) of FIG. 13 shows a diagram illustrating a 40-tap CFR at 30.72 MHz. As shown, the input signal has a bandwidth of 5 MHz, which has a Nyquist frequency of 7.68 MHz. Thus, the input signal has a sampling rate that is the same as the Nyquist frequency of 7.68 MHz. After two stages of 2× upsampling, the signal has a sampling rate of 30.72 MHz. Accordingly, the 40-tap CFR is also operated at the rate of 30.72 MHz. The output of the CFR is then upsampled by 4 times to reach a sampling frequency of 122.88 MHz. Graph (b) of FIG. 13 shows a diagram illustrating a 160-tap CFR at 122.88 MHz. In this case, the CFR is operated at the 122.88 MHz and no upsampling is performed on the output signal of CFR. Graph (c) of FIG. 13 shows a spectrum analysis for the 40-tap CFR at 30.72 MHz and the 160-tap CFR at 122.88 MHz. As shown, the 40-tap CFR at 30.72 MHz and 160-taps CFR at 122.88 MHz deliver approximately the same ACLR performance. However, increasing the windowing taps in the CFR by 4 times increases the implementation complexity of the CFR filter.

Figure 14:
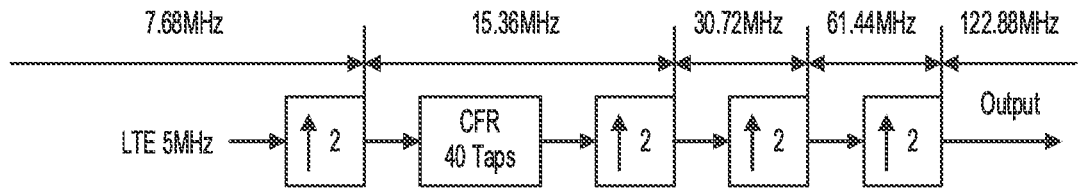
FIG. 14 shows an example upsampling CFR with a second upsampling ratio according to an implementation.
Figure 14:
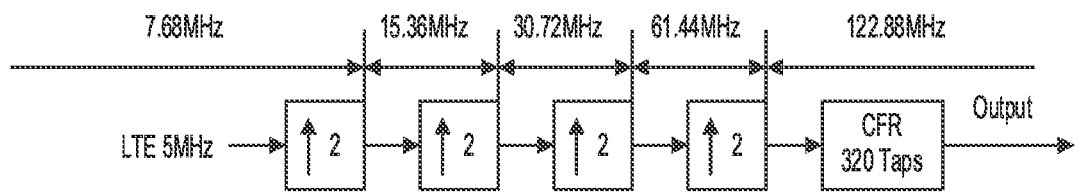
Figure 14:
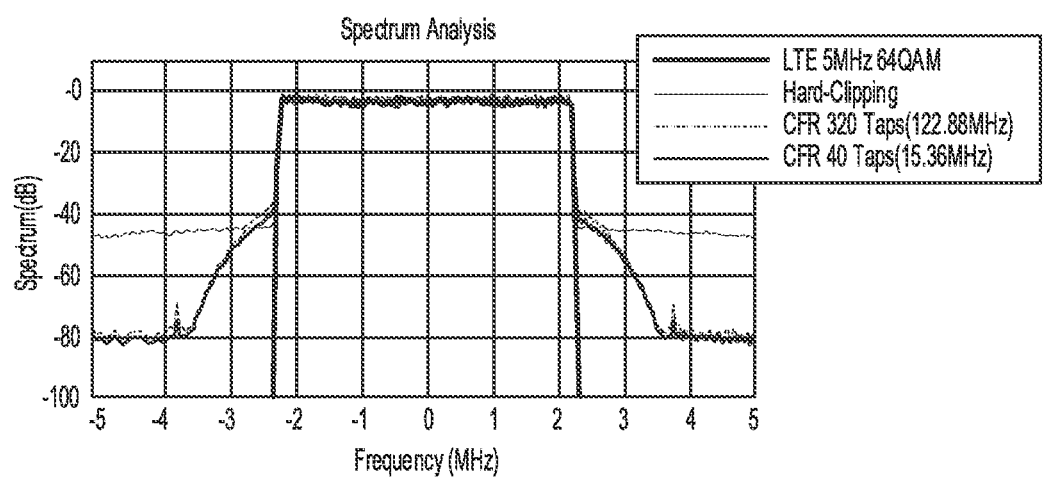

FIG. 14 shows an example upsampling CFR with a second upsampling ratio according to an implementation. Graph (a) of FIG. 14 shows a diagram illustrating a 40-tap CFR at 15.36 MHz. As shown, the CFR is operated at 2 times the Nyquist frequency of the input signal (7.68 MHz× 2=15.36 MHz). The output signal of the CFR is up-sampled by 8. Graph (b) of FIG. 14 shows a diagram illustrating a 320-tap CFR at 122.88 MHz, without further upsampling on the output signal of the CFR. Graph (c) of FIG. 14 shows a spectrum analysis for the 40-tap CFR at 15.36 MHz and the 320-tap CFR at 122.88 MHz. As shown, the 40-tap CFR at 15.36 MHz and 320-taps CFR at 122.88 MHz deliver approximately the same ACLR performance.

Figure 15:
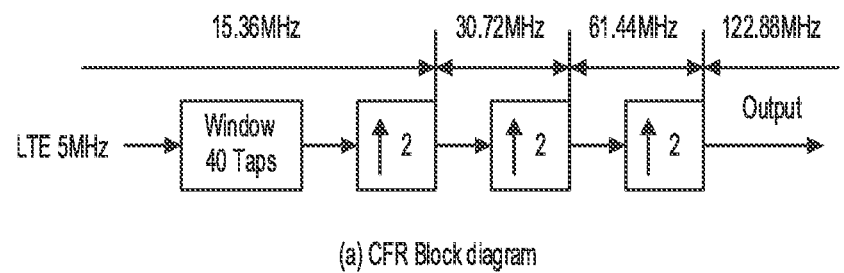
FIG. 15 shows an example upsampling CFR cascaded with digital up converter according to an implementation.
Figure 15:
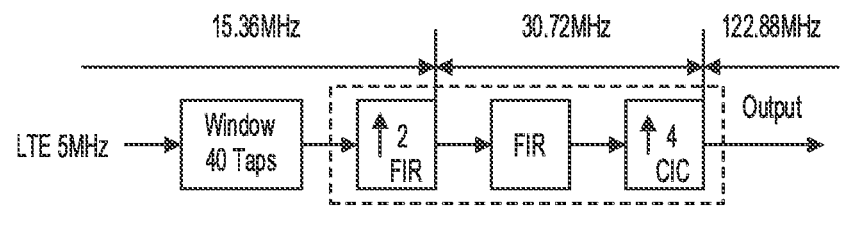

In some cases, up-sampling may be used with a digital up converter (DUC) in CFR to reduce silicon resource required to achieve targeting performance. FIG. 15 shows an example upsampling CFR cascaded with digital up converter according to an implementation. Graph (a) of FIG. 15 shows a block diagram illustrating a 40-tap CFR with up-sampling of 8. Graph (b) of FIG. 15 shows a block diagram illustrating a 40-tap CFR with up-sampling cascaded with DUC. The DUC includes a first stage FIR filter that interpolates by 2, a second stage FIR filter as a cascaded integrator-comb (CIC) compensator that compensates the drop response of CIC, and a CIC filter that interpolates by 4. In this example, the first stage FIR filter may include 27 taps, and the second stage FIR filter may include 22 taps.

Figure 16:
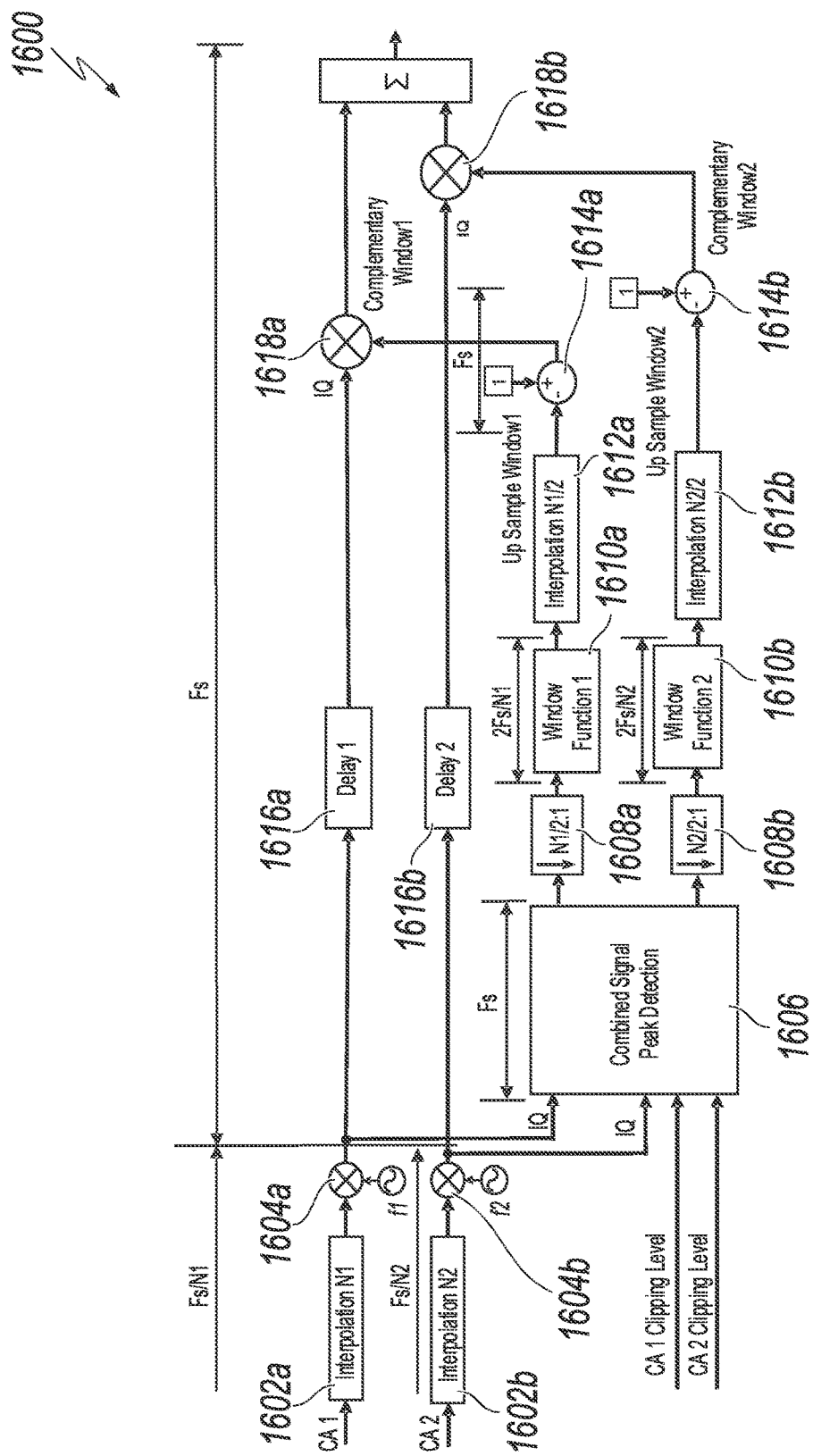
FIG. 16 is a schematic diagram illustrating an example two-carrier multi-rate CFR component according to an implementation.

FIG. 16 is a schematic diagram illustrating an example two-carrier multi-rate CFR component 1600 according to an implementation. In some cases, the crest factor reduction component 1600 can be used in a transmitter, e.g., in the user device 102 or in the base station 104 or in the transmitter 200, to reduce the peak amplitude of a source signal. As illustrated, the crest factor reduction component 1600 includes combined signal peak detection component 1606, interpolation components 1608a-b, windowing signal generators 1610a-b, and interpolation components 1612a-b. In some cases, the combined signal peak detection component 1606, interpolation components 1608a-b, windowing signal generators 1610a-b, and interpolation components 1612a-b can be used to generate a peak reduction signal based on an input signal. The multi-rate CFR component 1600 also includes delay registers 1616a-b and multipliers 1618a-b that are used to mix the input signal with the peak reduction signal to generate an output signal. The multi-rate CFR component 1600 also includes interpolation components 1602a-b and multipliers 1604a-b to perform up-sampling on carrier signals and generate the input signals to the combined signal peak detection component 1606 and the delay registers 1616a-b.

In some cases, the combined signal peak detection component 1606 and the windowing signal generators 1610a-b may process at different sampling rate domains. In one example, the combined signal peak detection component 1606 may process at high sampling rate domain (e.g., 245.76 MHz) to accurately identify the location and magnitude of the peak amplitude of an input signal. The windowing signal generators 1610a-b may process at low sampling rate domain (e.g., 15.36 MHz and/or 61.44 MHz) to achieve a better ACLR with low power consumption and small silicon area. In operation, the interpolation components 1602a-b may receive carrier signals from a first carrier and a second carrier at low sampling rates. In one example, the bandwidth of CA1 and CA2 can be 5 MHz and 20 MHz, respectively. The interpolation components 1602a-b may receive carrier signals at sampling rates that equal to the Nyquist frequency of 7.68 MHz and 30.72 MHz from the first carrier and the second carrier respectively. The interpolation components 1602a-b may perform up-sampling on the carrier signals by a factor of N1 and N2, respectively, and work with multipliers 1604a-b to generate input signals to the combined signal peak detection component 1606 at a high sampling rate Fs. In this example, Fs=245.76 MHz, N1=32 and N2=8. The combined signal peak detection component 1606 receives the input signals at the high sampling rate and perform a peak detection on the input signals to generate peak detection output signals. The interpolation components 1608a-b may perform down-sampling on the peak detection output signals to generate windowing input signals to the windowing signal generators 1610a-b at low sampling rates. As shown, the downsampling is performed by a factor of N1/2 and N2/2, respectively. In this example, the interpolation components 1608a-b may generate windowing input signals at sampling rates of 15.36 MHz and 61.44 MHz for the first carrier and the second carrier respectively. Then, the windowing signal generators 1610a-b can generate windowing output signals based on the windowing input signals at low sampling rates. The interpolation components 1612a-b perform up-sampling on the windowing output signals and generate peak reduction signals to bring it back to the high sampling rate Fs (e.g., 245.76 MHz). In some cases, different downsampling ratio can be used. For example, instead of using a downsampling ratio of N1/2 and N2/2, the interpolation components 1608a-b can use a downsampling ratio of N1 and N2 to further reduce the operating rates of the window function 1610a-b.

In some cases, the up/down sampling ratio (e.g., N1 and N2) of the interpolation components depend on the signal bandwidth. In some cases, the ratio of the narrow-band signal is higher than that of the wideband signal. For example, for a first carrier with a bandwidth of 5 MHz, the up/down-sampling ratio of the interpolation components 1602a, 1608a, and 1612a may be 32, 16, and 16 respectively. As a result, for a carrier signal at a sampling rate of 7.68 MHz from the first carrier, the input signal after up-sampling by the interpolation component 1602a, the windowing input signal after down-sampling by the interpolation component 1608a, and the peak reduction signal after the up-sampling by the interpolation components 1612a are generated at the sampling rates of 245.76 MHz, 15.36 MHz, and 245.76 MHz respectively.

As another example, for a second carrier with a bandwidth of 20 MHz, the up/down-sampling ratio of the interpolation components 1602b, 1608b, and 1612b may be 8, 4, and 4 respectively. As a result, for a carrier signal at a sampling rate of 30.72 MHz from the second carrier, the input signal after up-sampling by the interpolation component 1602b, the windowing input signal after down-sampling by the interpolation component 1608b, and the peak reduction signal after the up-sampling by the interpolation components 1612b are generated at the sampling rates of 245.76 MHz, 61.44 MHz, and 245.76 MHz respectively. As noted, a ratio between the windowing input signal sampling rate for the first carrier and the windowing input signal sampling rate or the second carrier is the same as a ratio between the first bandwidth of the first carrier and the second bandwidth of the second carrier.

In some cases, the peak reduction signals generated after the up-sampling by the interpolation components 1612a-b are multiplied by −1 and added to 1 (e.g., using the addition function units 1614a-b), and then mixed with delayed input signals (e.g., using the multipliers 1618a-b) to generate output signals. In some cases, the peak reduction signals are applied on both I and Q channels of input signals. Then, the output signals for the two carriers are summed by the summation function unit 1620 to generate a CFR output signal.

Figure 17:
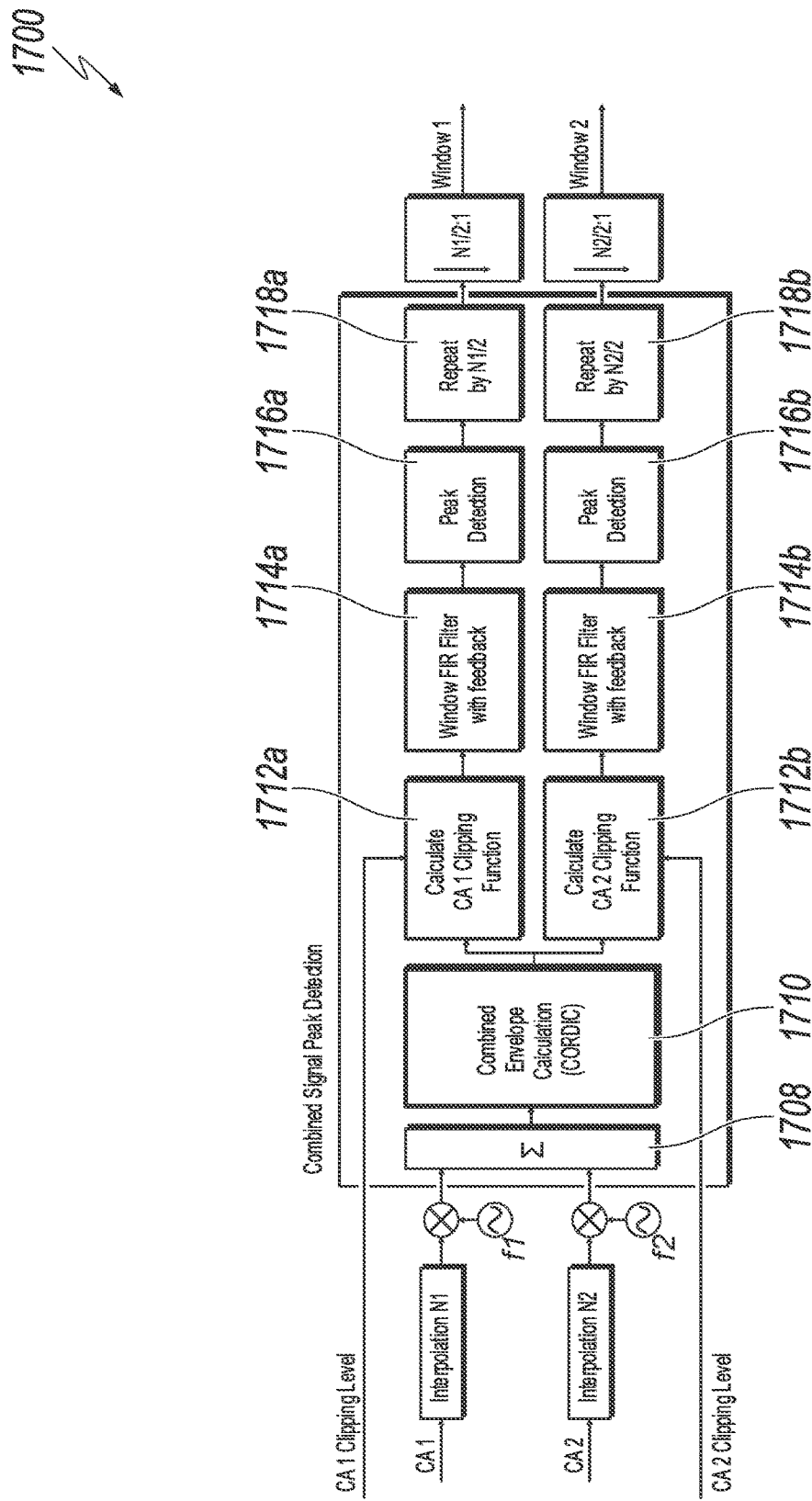
FIG. 17 is a schematic diagram illustrating an example two-carrier combined signal peak detection component according to an implementation.

FIG. 17 is a schematic diagram illustrating an example two-carrier combined signal peak detection component 1700 (e.g., combined signal peak detection component 1606 of FIG. 16) according to an implementation. In some cases, the combined signal peak detection component 1700 can be used in a CFR component, e.g., in the carrier aggregation transmitter 200, to detect the peak amplitude of an input signal. As illustrated, the combined signal peak detection component 1700 includes a summation function unit 1708, a combined envelop calculator with coordinate rotation digital computer (CORDIC) 1710, clipping signal generators 1712a-b, window FIR filter with feedback 1714a-b, peak detectors 1716a-b, and pulse repeaters 1718a-b. The summation function unit 1708, the combined envelop calculator 1710, and the clipping signal generators 1712a-b can be used to generate clipping signals based on input signals and clipping levels for the two carriers. In some cases, the clipping level represents a predetermined peak value for the output signal. In some cases, the clipping signal includes the location and magnitude of the peaks.

The following equation represents an example clipping function c(n) for generating the clipping signals.

$$c(n) = \begin{cases} 1, & |x(n)| \leq \text{Clipping Level} \\ \dfrac{\text{Clipping Level}}{|x(n)|}, & |x(n)| > \text{Clipping Level} \end{cases}.$$

In some cases, the clipping signals can have pulse-like waveform which may contain very wideband spectrum. In some cases, decimation included filter may not be able to down-sample the information (e.g., location and magnitude of the peaks) without distortion. The window FIR filters (e.g., window FIR filters 1714a-b), therefore, are used to smooth the clipping signals and keep the information of the peaks. In some cases, the windowing signal generator 700 may be used as the window FIR filters 1714a-b.

In some cases, the peak detectors 1716a-b receive filter output signals from the window FIR filters 1714a-b and determine location and magnitude of the peaks. The output of the peak detection may be repeated by N/2 by the pulse repeaters 1718a-b, where N/2 is the predetermined down-sampling ratio.

Figure 18:
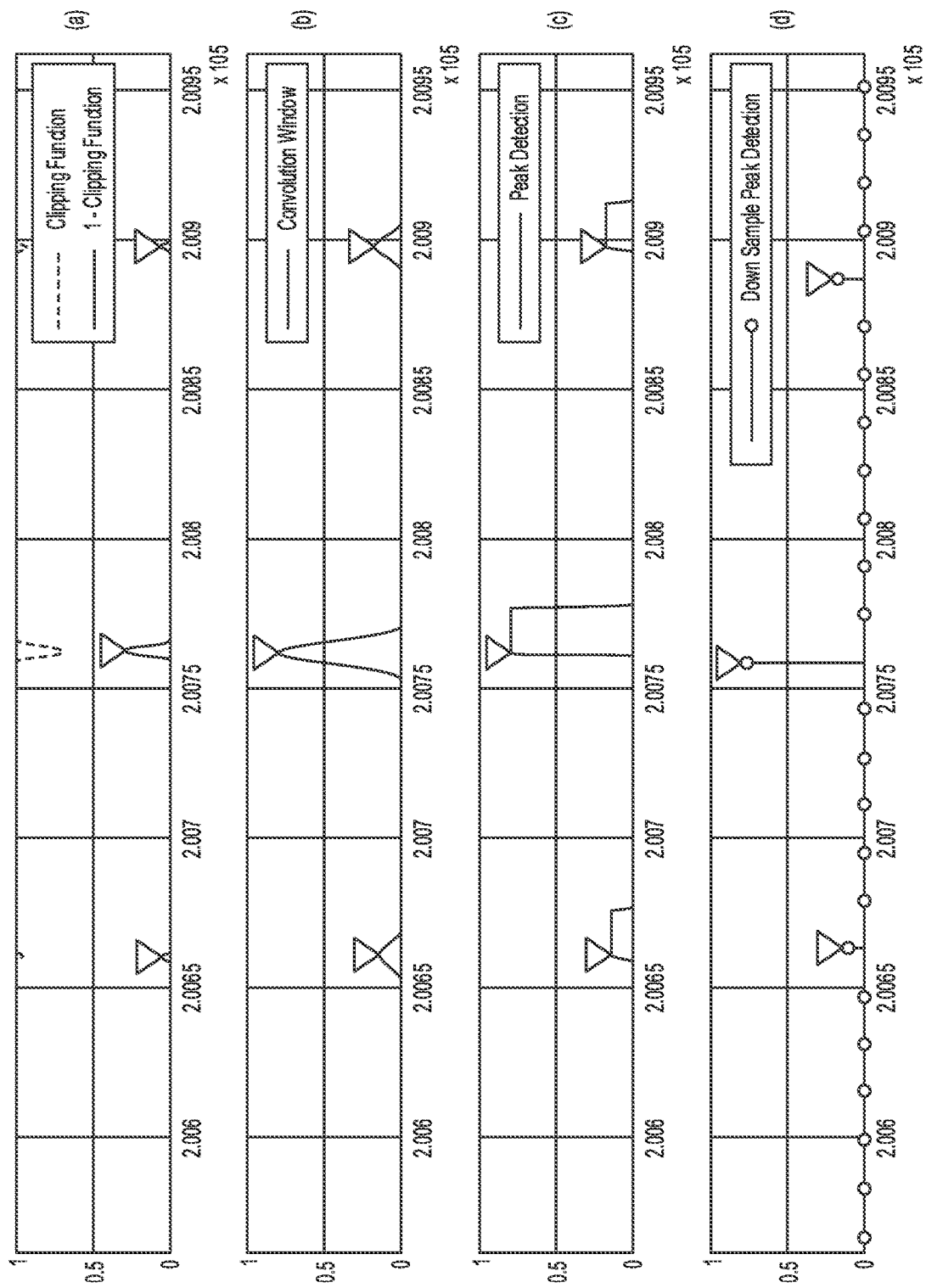
FIG. 18 shows the waveforms in an example peak detection process according to an implementation.
Figure 19:
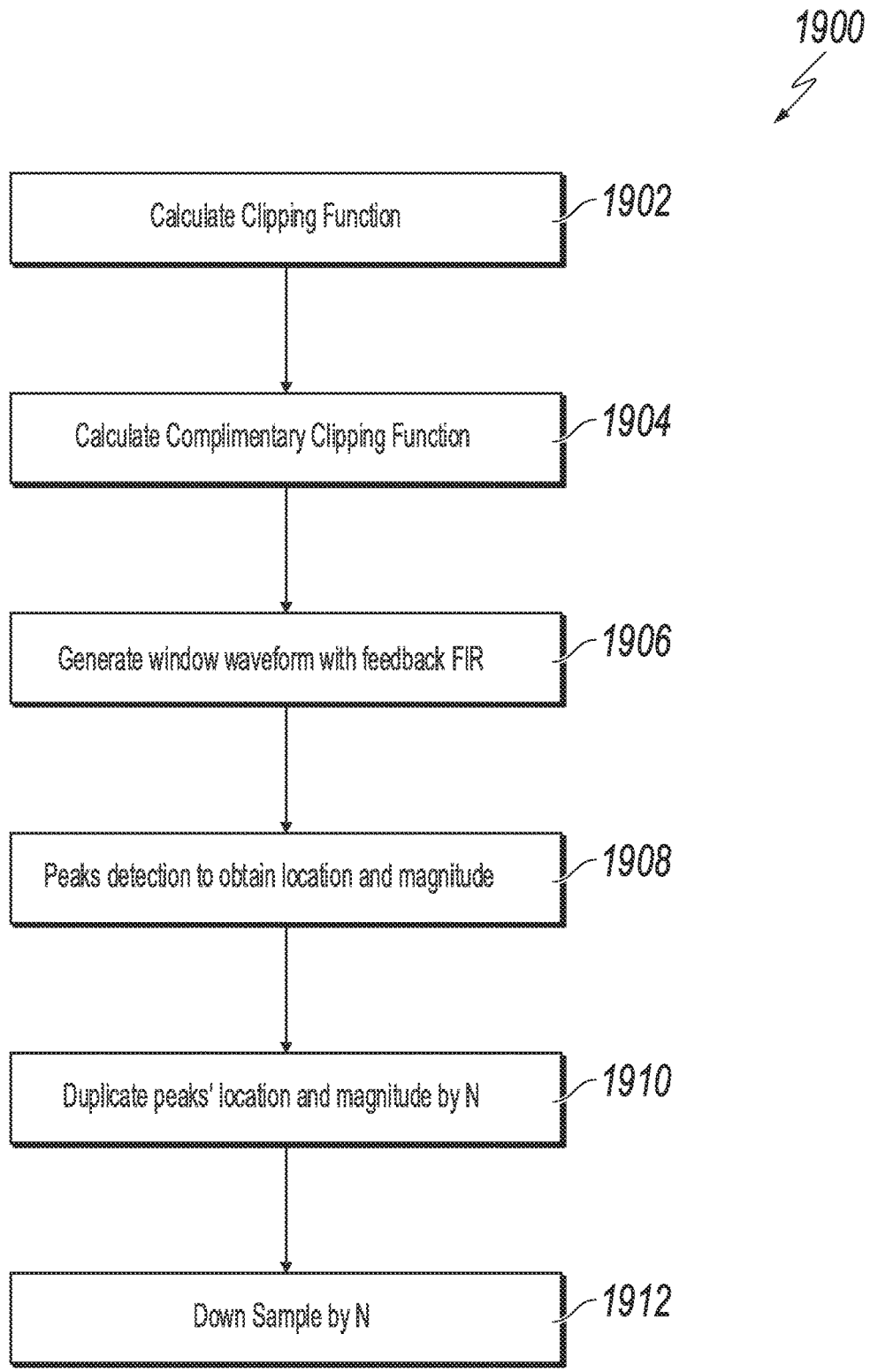
FIG. 19 is a flowchart illustrating an example method for peak detection according to an implementation.

FIG. 18 shows the waveforms in an example peak detection process, which will be explained in greater detail below with reference to FIG. 19. FIG. 19 is a flowchart illustrating an example method 1900 for peak detection. In some cases, the method 1900 may be implemented by a peak detector (e.g., peak detector 1718a/b). The method 1900 may begin at block 1902, where a clipping function is calculated. For example, the clipping function may be calculated using the above-described clipping function c(n). In some cases, the clipping function may be calculated based on an envelope output signal from the combined envelope calculator 1710 and a clipping level.

At block 1904, a complimentary clipping function is generated based on the calculated clipping function. In some cases, the calculated clipping function may be multiplied by −1 and added to 1 to generate the complementary clipping function. For example, graph (a) of FIG. 18 shows waveform of the clipping function and waveform of the complimentary clipping function (e.g., 1−clipping function). In the figure, the peaks' location are indicated by the triangles.

At block 1906, window waveform is generated with feedback FIR. For example, the window FIR filters 1714a-b may be used to smooth the clipping function and generate window waveforms as input signals to the peak detectors 1716a-b. Graph (b) of FIG. 18 shows the window waveform generated with feedback FIR.

At block 1908, peak detection is performed to obtain location and magnitude of the peaks. For example, the peak detectors 1716a-b may receive the window waveforms from the window FIR filters 1714a-b and pinpoint the peaks' location and magnitude. In some cases, the peak detection may be performed based on slop changes from positive to negative to determine the peaks' location. Graph (c) of FIG. 18 shows the locations and magnitudes of the peaks.

At block 1910, the peaks' location and magnitude are duplicated by N. For example, the pulse repeaters 1718a-b may repeat the output of the peak detection by N, where N is a predetermined down-sampling ratio.

At block 1912, the output from the duplication of the peak detection is down-sampled. In some cases, the output may be down-sampled by N, wherein N is a down-sampling ratio that is the same as the number N by which the peaks' location and magnitude are duplicated. In some cases, 1 out of N samples may be selected from the output signal of the pulse repeaters 1718a-b. Graph (d) of FIG. 18 shows the down-sampled peak detection.

Figure 20:
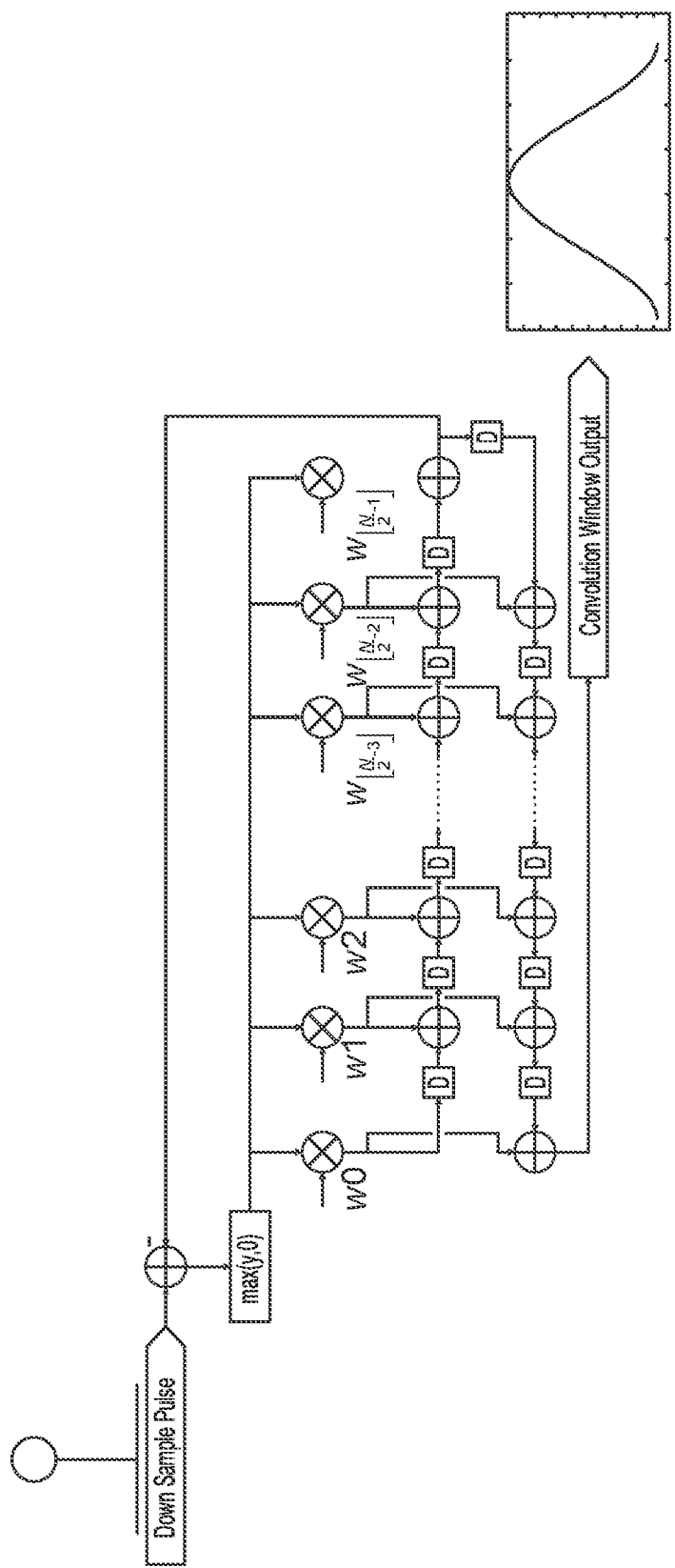
FIG. 20 is a schematic diagram illustrating an example windowing signal generator according to an implementation.

FIG. 20 is a schematic diagram illustrating an example windowing signal generator 2000 according to an implementation. The windowing signal generator 2000 can be used in a multi-rate CFR component, e.g., multi-rate CFR component 1600. In some cases, the windowing signal generator 2000 can be used as the windowing signal generators 1610a-b in FIG. 16. In some cases, modification of the real-time mode window function is required for the low sampling rate CFR. For example, compared with the windowing signal generator 700, the complementary computation (for example, 1−c(n)) is removed in the windowing signal generator 2000 since the down-sampling pulse has accomplished such calculation. The windowing signal generator 2000 receives down-sampling pulses to generate window waveform with low sample rate.

Figure 21:
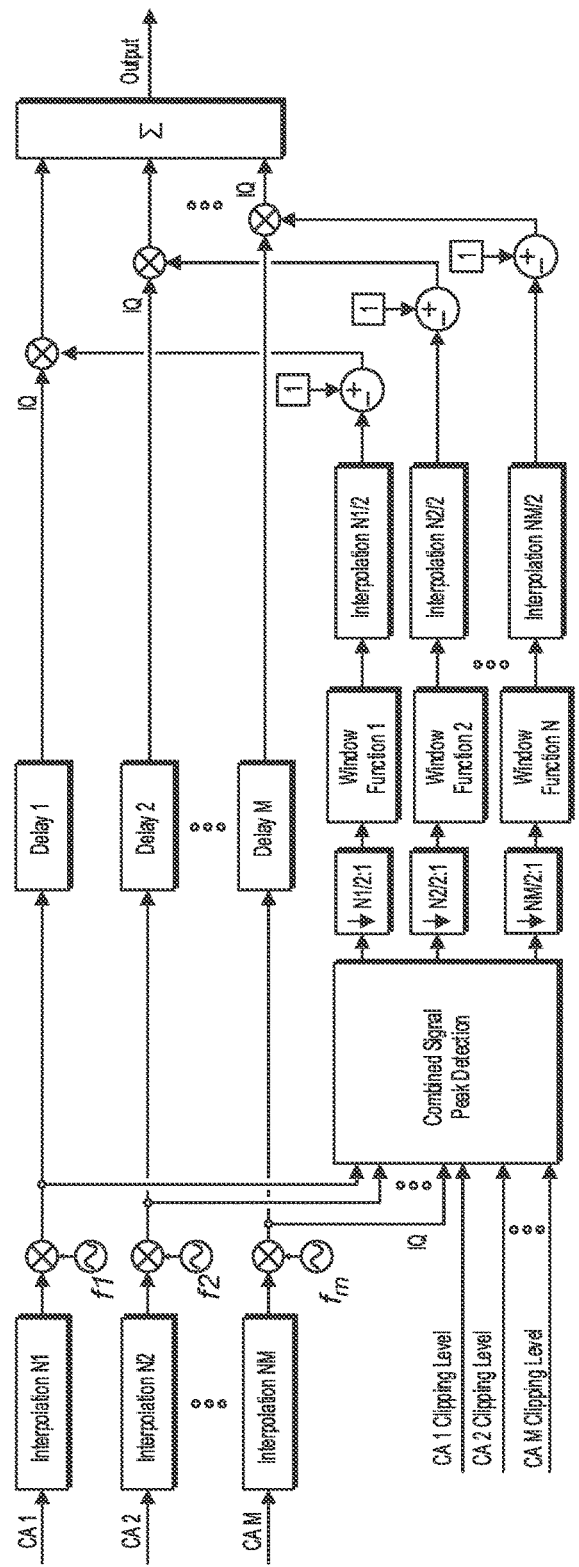
FIG. 21 is a schematic diagram illustrating an example multi-carrier multi-rate CFR component according to an implementation.

FIG. 21 is a schematic diagram illustrating an example multi-carrier multi-rate CFR component 2100 according to an implementation. As illustrated, the CFR component 2100 receives carrier signals from M carriers, as opposed to 2 carriers in FIG. 16. Note that the CFR component 2100, when M=2, is the same as the CFR component 1600 of FIG. 16. Each of the M carrier signals may be processed by a respective set of interpolation components with different up/down sampling ratios. In some cases, the windowing signal generators for each of the M carrier signal may have the same number of delay taps (e.g., 40 taps).

Figure 22:
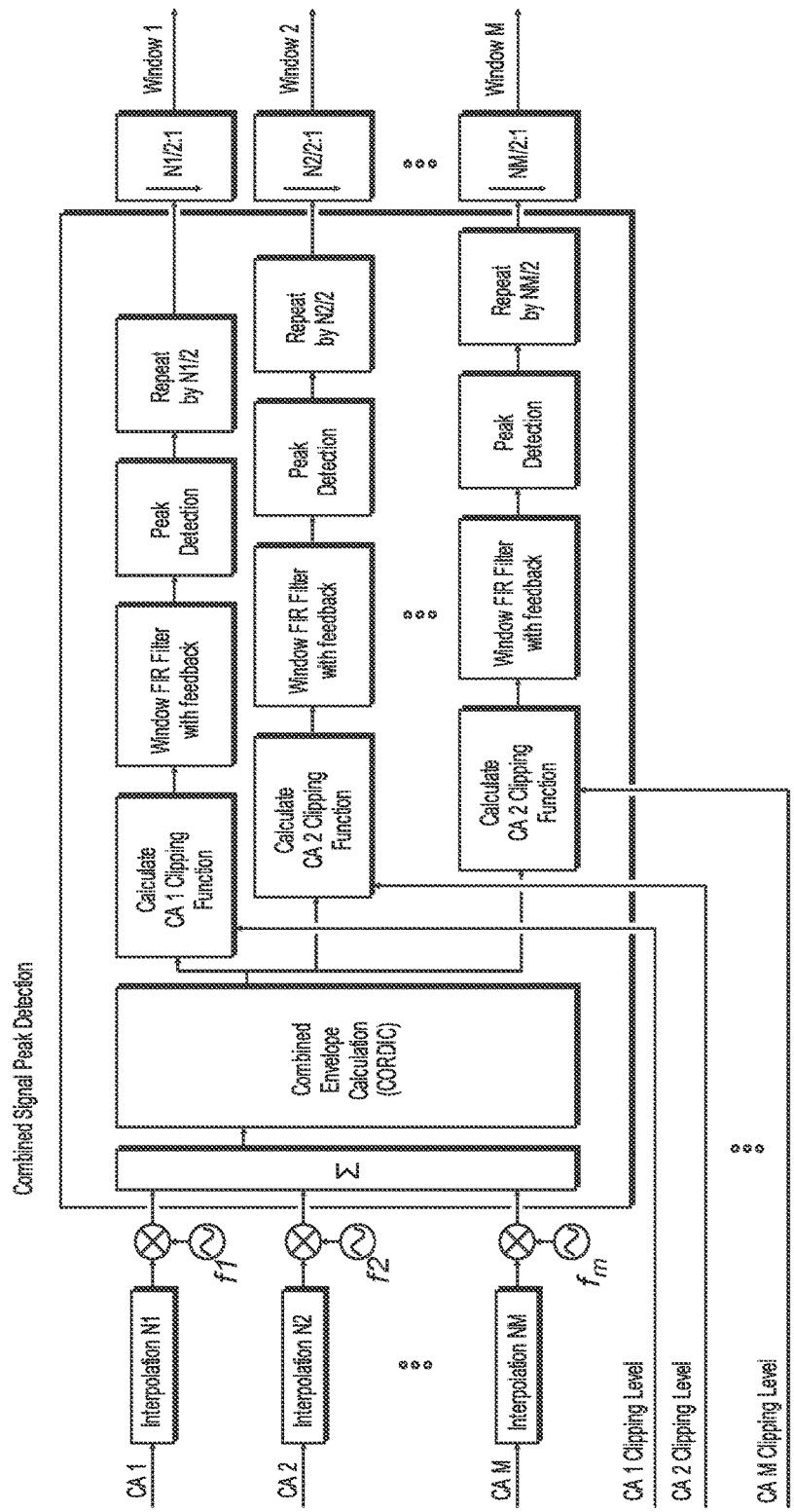
FIG. 22 is a schematic diagram illustrating an example multi-carrier combined signal peak detection component according to an implementation.

FIG. 22 is a schematic diagram illustrating an example multi-carrier combined signal peak detection component 2200. As illustrated, each of the M carriers has its own clipping level to achieve the maximal peak reduction results. Note that the peak detection component 2200, when M=2, is the same as the peak detection component 1700 of FIG. 17.

Figure 23:
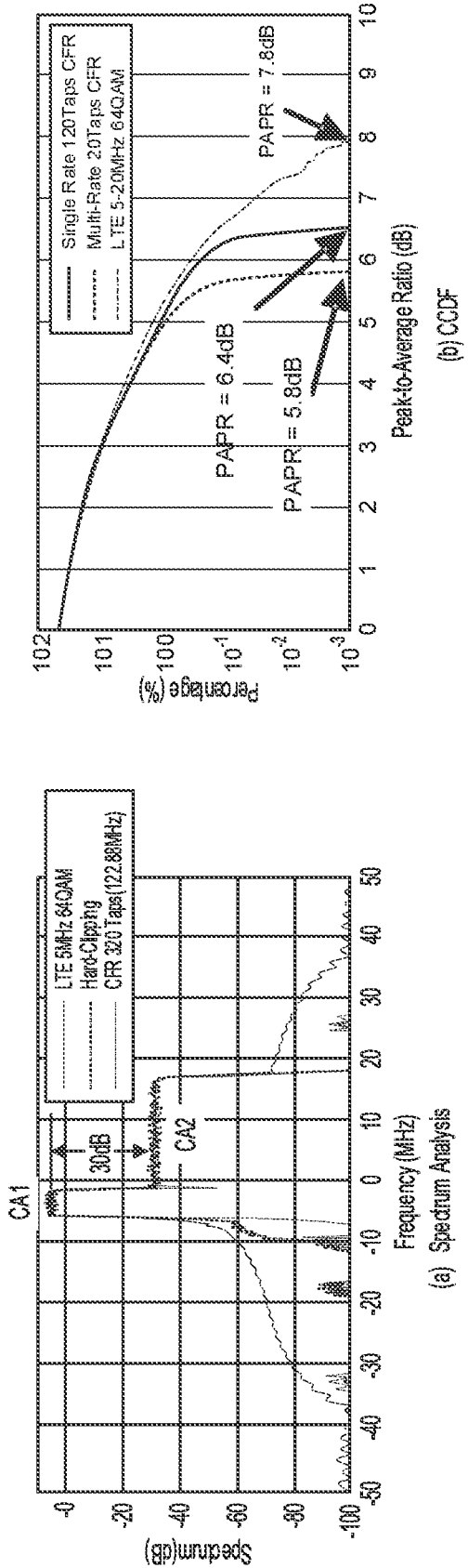
FIG. 23 shows a comparison of performance of single-rate and multi-rate CFR according to an implementation.

FIG. 23 shows a comparison of performance of single-rate and multi-rate CFR. As shown in graph (a) of FIG. 23, the carrier CA2 has a power that is lower than that of the carrier CA1 by 30 dB. The poor ACLR improvement of CA1 from single rate CFR (120 taps) degrades EVM of the adjacent carrier, CA2. The PAPR may not be further reduced since the EVM of CA2 has been reduced to −29 dB already. Graph (b) of FIG. 23 shows that, with the multi-rate CFR (20 taps), the ACLR is improved by 0.6 dB (6.4 dB-5.8 dB) more peak reduction. Graphs (c) and (d) of FIG. 23 show that, with the multi-rate CFR (20 taps), the ACLR is improved with 7 dBc more as opposed to with the single-rate CFR, and that the EVM of both carriers is lower than −30 dB with multi-rate CFR.

Figure 24:
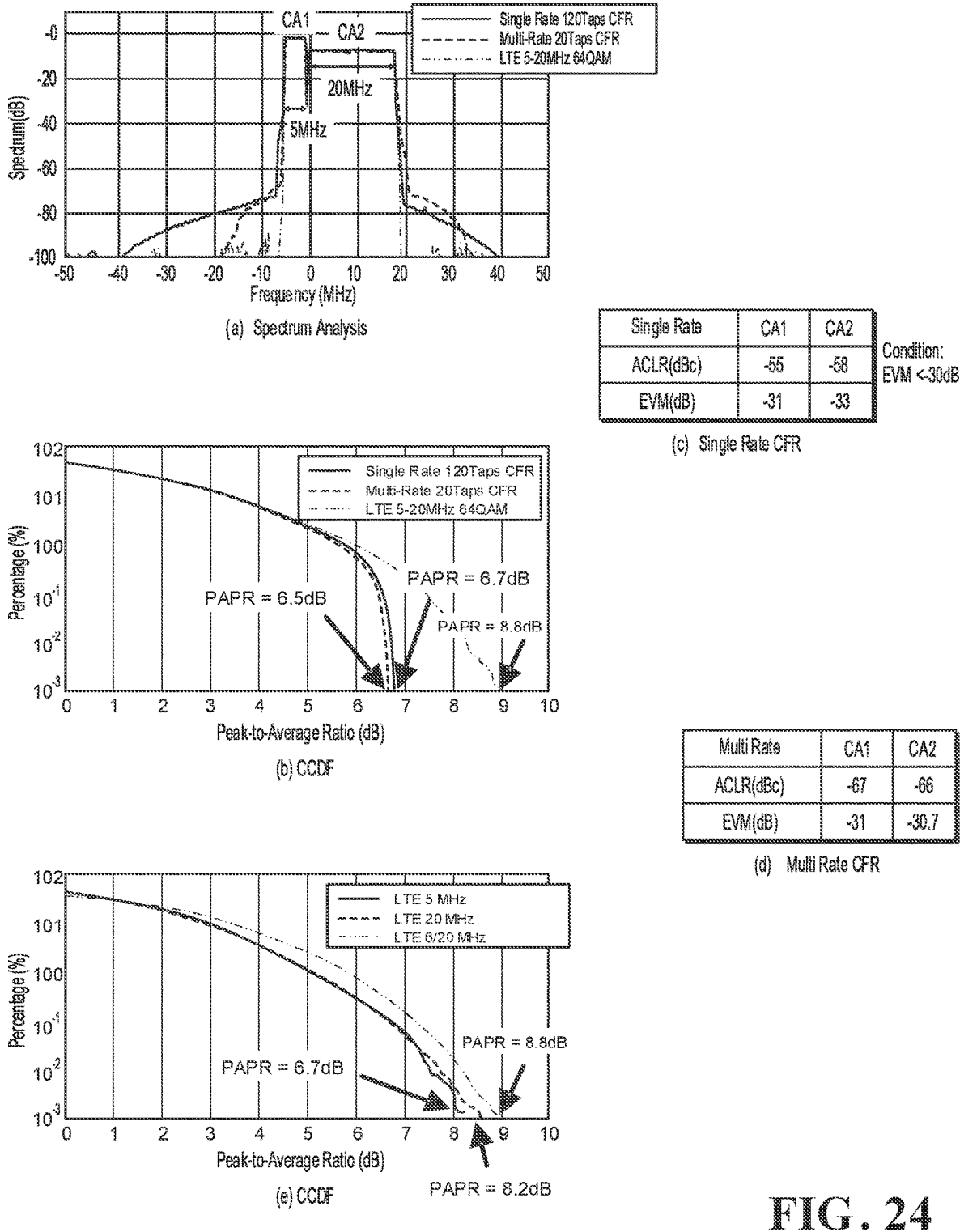
FIG. 24 shows a comparison of performance of single-rate and multi-rate CFR according to an implementation.

FIG. 24 shows a comparison of performance of single-rate and multi-rate CFR. As shown in graph (a) of FIG. 24, the carrier CA2 has a power close to that of the carrier CA1. Single rate CFR delivers unbalanced ACLR/EVM performance and may not use silicon resource efficiently. For example, the ACLR of carrier CA2 is excessively good with 120 taps. But the ACLR of carrier CA1 is poor and can interfere with carrier CA2. Multi-rate CFR delivers balanced ACLR/EVM performance with lower PAPR and silicon resource. As shown in graph (b) of FIG. 24, multi-rate CFR reduces 0.2 dB more than single-rate CFR. Graphs (c) and (d) of FIG. 24 show that multi-rate CFR has better balanced ACLR/EVM performance. Multi-rate CFR, therefore, demonstrates better performance than the single rate CFR with equal power of the two carrier aggregation configuration.

Figure 25:
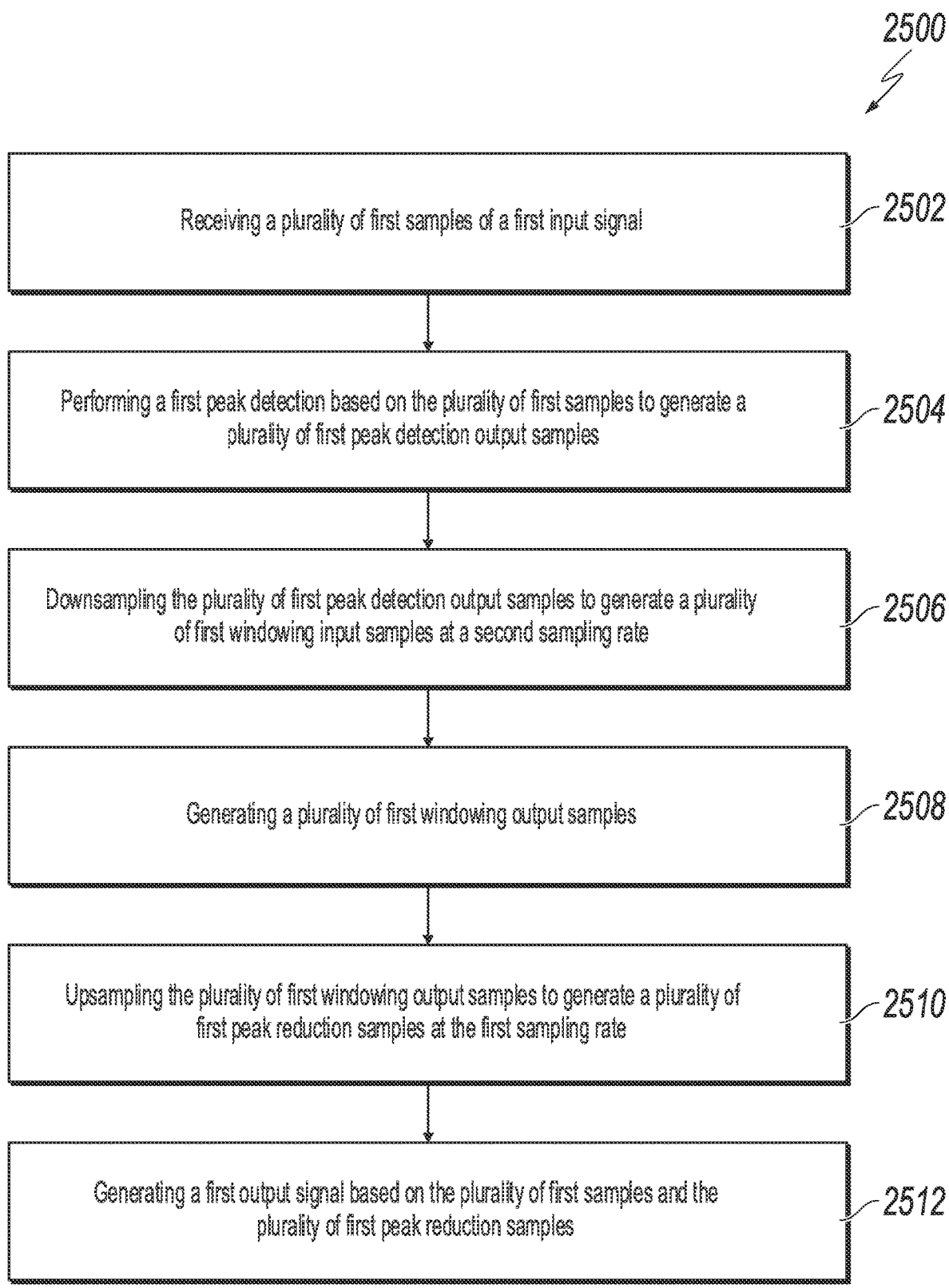
FIG. 25 is a flow chart illustrating an example method for reducing crest factors according to an implementation.

FIG. 25 is a flow chart illustrating an example method 2500 for reducing crest factors. In some cases, the method 2500 can be implemented by a multi-rate CFR component (e.g., multi-rate CFR component 1600 or 2100).

The method 2500 may begin at block 2502 where a plurality of first samples of a first input signal are received. In some cases, the plurality of first samples are generated at a first sampling rate (e.g., 245.76 MHz). In some cases, the first input signal includes an input signal of a first carrier. In some cases, a plurality of second samples of a second input signal are also received. The plurality of second samples can be generated at the first sampling rate, and the second input signal can include an input signal of a second carrier. In some cases, the first carrier has a first bandwidth (e.g., 5 MHz) and the second carrier has a second bandwidth (e.g. 20 MHz).

At block 2504, a first peak detection is performed on the plurality of first samples to generate a plurality of first peak detection output samples. In some cases, a second peak detection is performed on the plurality of second samples to generate a plurality of second peak detection output samples.

At block 2506, a plurality of first windowing input samples are generated at a second sampling rate (e.g., 15.36 MHz) by down-sampling the plurality of first peak detection output samples. In some cases, a plurality of second windowing input samples are generated at a third sampling rate (e.g., 61.44 MHz) by down-sampling the plurality of second peak detection output samples. In some cases, a ratio between the second sampling rate and the third sampling rate is the same as a ratio between the first bandwidth of the first carrier and the second bandwidth of the second carrier.

At block 2508, a plurality of first windowing output samples are generated based on the plurality of first windowing input samples. In some cases, a plurality of second windowing output samples are generated based on the plurality of second windowing input samples.

At block 2510, a plurality of first peak reduction samples are generated at the first sampling rate by upsampling the plurality of first windowing output samples. In some cases, a plurality of second peak reduction samples are generated at the second sampling rate by upsampling the plurality of second windowing output samples.

At block 2512, a first output signal is generated based on the plurality of first samples and the plurality of first peak reduction samples. In some cases, generating the first output signal includes applying the plurality of first peak reduction samples on both I and Q channels of on the plurality of first samples. In some cases, a second output signal is generated based on the plurality of second samples and the plurality of second peak reduction samples.

In some cases, the actions as described above in method 2500 on the first and second carriers are done in parallel/simultaneously.

Figure 26:
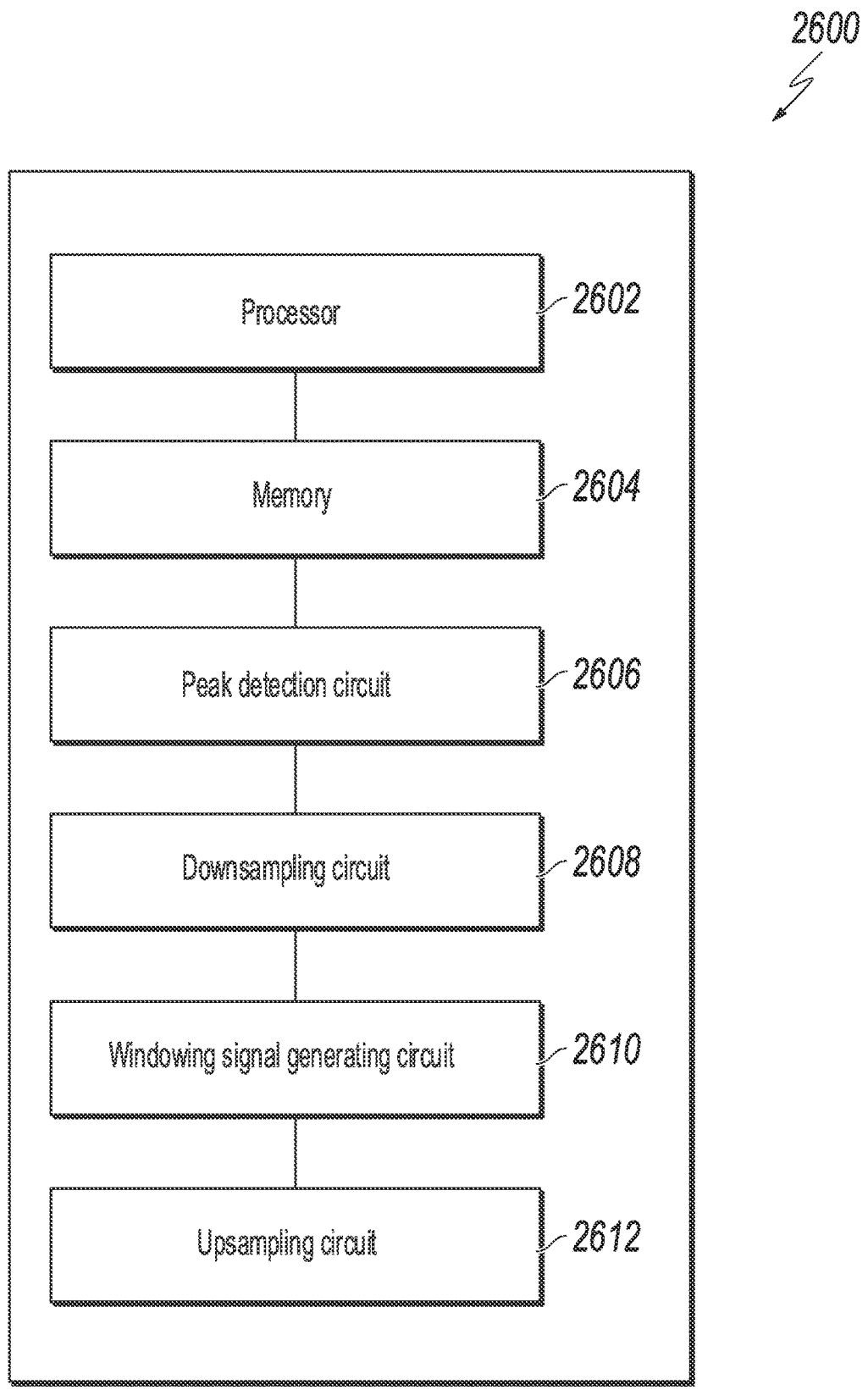
FIG. 26 is a schematic diagram illustrating an example structure of an electronic device according to an implementation.

FIG. 26 is a schematic diagram illustrating an example structure of an electronic device 2600 described in the present disclosure, according to an implementation. The electronic device 2600 includes one or more processors 2602, a memory 2604, a peak detection circuit 2606, a downsampling circuit 2608, a windowing signal generating circuit 2610, and an upsampling circuit 2612. In some implementations, electronic device 2600 can further include one or more circuits for performing any one or a combination of steps described in the present disclosure.

Described implementations of the subject matter can include one or more features, alone or in combination.

In a first implementation, a method for reducing crest factors includes: receiving a plurality of first samples of a first input signal, wherein the plurality of first samples are generated at a first sampling rate; performing a first peak detection based on the plurality of first samples to generate a plurality of first peak detection output samples; downsampling the plurality of first peak detection output samples to generate a plurality of first windowing input samples at a second sampling rate; generating a plurality of first windowing output samples based on the plurality of first windowing input samples; upsampling the plurality of first windowing output samples to generate a plurality of first peak reduction samples at the first sampling rate; and generating a first output signal based on the plurality of first samples and the plurality of first peak reduction samples.

The foregoing and other described implementations can each, optionally, include one or more of the following features:

A first feature, combinable with any of the following features, where the first input signal includes an input signal of a first carrier, and the method further includes: receiving a plurality of second samples of a second input signal, wherein the plurality of second samples are generated at the first sampling rate, and the second input signal comprises an input signal of a second carrier; performing a second peak detection based on the plurality of second samples to generate a plurality of second peak detection output samples; downsampling the plurality of second peak detection output samples to generate a plurality of second windowing input samples at a third sampling rate; generating a plurality of second windowing output samples based on the plurality of second windowing input samples; upsampling the plurality of second windowing output samples to generate a plurality of second peak reduction samples at the second sampling rate; and generating a second output signal based on the plurality of second samples and the plurality of second peak reduction samples.

A second feature, combinable with any of the previous or following features, where a ratio between the second sampling rate and the third sampling rate is the same as a ratio between a first bandwidth of the first carrier and a second bandwidth of the second carrier.

A third feature, combinable with any of the previous or following features, where the generating the first output signal comprises applying the plurality of first peak reduction samples on both I and Q channels of the plurality of first samples.

A fourth feature, combinable with any of the previous or following features, where performing the first peak detection includes: generating a plurality of first clipping samples based on the plurality of first samples and a first clipping level; generating a plurality of first window filtering output samples based on the plurality of first clipping samples; and generating the plurality of first peak detection output samples based on the plurality of first window filtering output samples.

A fifth feature, combinable with any of the previous or following features, where performing the second peak detection includes: generating a plurality of second clipping samples based on the plurality of second samples and a second clipping level; generating a plurality of second window filtering output samples based on the plurality of second clipping samples; and generating the plurality of second peak detection output samples based on the plurality of second window filtering output samples.

A sixth feature, combinable with any of the previous or following features, where the plurality of first samples are generated by upsampling a first carrier signal of the first carrier, and the plurality of second samples are generated by upsampling a second carrier signal of the second carrier.

A seventh feature, combinable with any of the previous features, where the plurality of first windowing output samples and the plurality of second windowing output samples are generated using a same number of delay taps.

In a second implementation, an electronic device includes: a non-transitory memory storage comprising instructions; and one or more hardware processors in communication with the memory storage, wherein the one or more hardware processors execute the instructions to: receive a plurality of first samples of a first input signal, wherein the plurality of first samples are generated at a first sampling rate; perform a first peak detection based on the plurality of first samples to generate a plurality of first peak detection output samples; downsample the plurality of first peak detection output samples to generate a plurality of first windowing input samples at a second sampling rate; generate a plurality of first windowing output samples based on the plurality of first windowing input samples; upsample the plurality of first windowing output samples to generate a plurality of first peak reduction samples at the first sampling rate; and generate a first output signal based on the plurality of first samples and the plurality of first peak reduction samples.

The foregoing and other described implementations can each, optionally, include one or more of the following features:

A first feature, combinable with any of the following features, where the first input signal includes an input signal of a first carrier, and the one or more hardware processors further execute the instructions to: receive a plurality of second samples of a second input signal, wherein the plurality of second samples are generated at the first sampling rate, and the second input signal comprises an input signal of a second carrier; perform a second peak detection based on the plurality of second samples to generate a plurality of second peak detection output samples; downsample the plurality of second peak detection output samples to generate a plurality of second windowing input samples at a third sampling rate; generate a plurality of second windowing output samples based on the plurality of second windowing input samples; upsample the plurality of second windowing output samples to generate a plurality of second peak reduction samples at the second sampling rate; and generate a second output signal based on the plurality of second samples and the plurality of second peak reduction samples.

A second feature, combinable with any of the previous or following features, where a ratio between the second sampling rate and the third sampling rate is the same as a ratio between a first bandwidth of the first carrier and a second bandwidth of the second carrier.

A third feature, combinable with any of the previous or following features, where the generating the first output signal includes applying the plurality of first peak reduction samples on both I and Q channels of the plurality of first samples.

A fourth feature, combinable with any of the previous or following features, where performing the first peak detection includes: generating a plurality of first clipping samples based on the plurality of first samples and a first clipping level; generating a plurality of first window filtering output samples based on the plurality of first clipping samples; and generating the plurality of first peak detection output samples based on the plurality of first window filtering output samples.

A fifth feature, combinable with any of the previous or following features, where performing the second peak detection includes: generating a plurality of second clipping samples based on the plurality of second samples and a second clipping level; generating a plurality of second window filtering output samples based on the plurality of second clipping samples; and generating the plurality of second peak detection output samples based on the plurality of second window filtering output samples.

A sixth feature, combinable with any of the previous or following features, where the plurality of first samples are generated by upsampling a first carrier signal of the first carrier, and the plurality of second samples are generated by upsampling a second carrier signal of the second carrier.

A seventh feature, combinable with any of the previous features, where the plurality of first windowing output samples and the plurality of second windowing output samples are generated using a same number of delay taps.

In a third implementation, a non-transitory computer-readable medium storing computer instructions for reducing crest factors, that when executed by one or more hardware processors, cause the one or more hardware processors to perform operations including: receiving a plurality of first samples of a first input signal, wherein the plurality of first samples are generated at a first sampling rate; performing a first peak detection based on the plurality of first samples to generate a plurality of first peak detection output samples; downsampling the plurality of first peak detection output samples to generate a plurality of first windowing input samples at a second sampling rate; generating a plurality of first windowing output samples based on the plurality of first windowing input samples; upsampling the plurality of first windowing output samples to generate a plurality of first peak reduction samples at the first sampling rate; and generating a first output signal based on the plurality of first samples and the plurality of first peak reduction samples.

The foregoing and other described implementations can each, optionally, include one or more of the following features:

A first feature, combinable with any of the following features, where the first input signal includes an input signal of a first carrier, and the operations further include: receiving a plurality of second samples of a second input signal, wherein the plurality of second samples are generated at the first sampling rate, and the second input signal comprises an input signal of a second carrier; performing a second peak detection based on the plurality of second samples to generate a plurality of second peak detection output samples; downsampling the plurality of second peak detection output samples to generate a plurality of second windowing input samples at a third sampling rate; generating a plurality of second windowing output samples based on the plurality of second windowing input samples; upsampling the plurality of second windowing output samples to generate a plurality of second peak reduction samples at the second sampling rate; and generating a second output signal based on the plurality of second samples and the plurality of second peak reduction samples.

A second feature, combinable with any of the previous or following features, where a ratio between the second sampling rate and the third sampling rate is the same as a ratio between a first bandwidth of the first carrier and a second bandwidth of the second carrier.

A third feature, combinable with any of the previous or following features, where the generating a first output signal comprises applying the plurality of first peak reduction samples on both I and Q channels of the plurality of first samples.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," and "computer," (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer-readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for reducing crest factors, the method comprising:
   receiving a plurality of first samples of a first input signal, the plurality of first samples generated at a first sampling rate;
   performing a first peak detection based on the plurality of first samples to generate a plurality of first peak detection output samples;
   downsampling the plurality of first peak detection output samples to generate a plurality of first windowing input samples at a second sampling rate;
   generating a plurality of first windowing output samples based on the plurality of first windowing input samples;
   upsampling the plurality of first windowing output samples to generate a plurality of first peak reduction samples at the first sampling rate; and
   generating a first output signal based on the plurality of first samples and the plurality of first peak reduction samples.

2. The method according to claim 1, wherein the first input signal comprises an input signal of a first carrier, and the method further comprises:
   receiving a plurality of second samples of a second input signal, wherein the plurality of second samples are generated at the first sampling rate, and the second input signal comprises an input signal of a second carrier;

performing a second peak detection based on the plurality of second samples to generate a plurality of second peak detection output samples;
downsampling the plurality of second peak detection output samples to generate a plurality of second windowing input samples at a third sampling rate;
generating a plurality of second windowing output samples based on the plurality of second windowing input samples;
upsampling the plurality of second windowing output samples to generate a plurality of second peak reduction samples at the second sampling rate; and
generating a second output signal based on the plurality of second samples and the plurality of second peak reduction samples.

3. The method according to claim 2, wherein a ratio between the second sampling rate and the third sampling rate is the same as a ratio between a first bandwidth of the first carrier and a second bandwidth of the second carrier.

4. The method according to claim 2, wherein the generating the first output signal comprises applying the plurality of first peak reduction samples on both I and Q channels of the plurality of first samples.

5. The method according to claim 2, wherein performing the first peak detection comprises:
generating a plurality of first clipping samples based on the plurality of first samples and a first clipping level;
generating a plurality of first window filtering output samples based on the plurality of first clipping samples; and
generating the plurality of first peak detection output samples based on the plurality of first window filtering output samples.

6. The method according to claim 5, wherein performing the second peak detection comprises:
generating a plurality of second clipping samples based on the plurality of second samples and a second clipping level;
generating a plurality of second window filtering output samples based on the plurality of second clipping samples; and
generating the plurality of second peak detection output samples based on the plurality of second window filtering output samples.

7. The method according to claim 2, wherein the plurality of first samples are generated by upsampling a first carrier signal of the first carrier, and the plurality of second samples are generated by upsampling a second carrier signal of the second carrier.

8. The method according to claim 2, wherein the plurality of first windowing output samples and the plurality of second windowing output samples are generated using a same number of delay taps.

9. An electronic device comprising:
a non-transitory memory storage comprising instructions; and
one or more hardware processors in communication with the non-transitory memory storage, the one or more hardware processors configured to execute the instructions to cause the electronic device to:
receive a plurality of first samples of a first input signal, the plurality of first samples generated at a first sampling rate;
perform a first peak detection based on the plurality of first samples to generate a plurality of first peak detection output samples;
downsample the plurality of first peak detection output samples to generate a plurality of first windowing input samples at a second sampling rate;
generate a plurality of first windowing output samples based on the plurality of first windowing input samples;
upsample the plurality of first windowing output samples to generate a plurality of first peak reduction samples at the first sampling rate; and
generate a first output signal based on the plurality of first samples and the plurality of first peak reduction samples.

10. The electronic device according to claim 9, wherein the first input signal comprises an input signal of a first carrier, and the one or more hardware processors further execute the instructions to:
receive a plurality of second samples of a second input signal, wherein the plurality of second samples are generated at the first sampling rate, and the second input signal comprises an input signal of a second carrier;
perform a second peak detection based on the plurality of second samples to generate a plurality of second peak detection output samples;
downsample the plurality of second peak detection output samples to generate a plurality of second windowing input samples at a third sampling rate;
generate a plurality of second windowing output samples based on the plurality of second windowing input samples;
upsample the plurality of second windowing output samples to generate a plurality of second peak reduction samples at the second sampling rate; and
generate a second output signal based on the plurality of second samples and the plurality of second peak reduction samples.

11. The electronic device according to claim 10, wherein a ratio between the second sampling rate and the third sampling rate is the same as a ratio between a first bandwidth of the first carrier and a second bandwidth of the second carrier.

12. The electronic device according to claim 10, wherein generating the first output signal comprises applying the plurality of first peak reduction samples on both I and Q channels of the plurality of first samples.

13. The electronic device according to claim 10, wherein performing the first peak detection comprises:
generating a plurality of first clipping samples based on the plurality of first samples and a first clipping level;
generating a plurality of first window filtering output samples based on the plurality of first clipping samples; and
generating the plurality of first peak detection output samples based on the plurality of first window filtering output samples.

14. The electronic device according to claim 10, wherein performing the second peak detection comprises:
generating a plurality of second clipping samples based on the plurality of second samples and a second clipping level;
generating a plurality of second window filtering output samples based on the plurality of second clipping samples; and
generating the plurality of second peak detection output samples based on the plurality of second window filtering output samples.

15. The electronic device according to claim 10, wherein the plurality of first samples are generated by upsampling a first carrier signal of the first carrier, and the plurality of second samples are generated by upsampling a second carrier signal of the second carrier.

16. The electronic device according to claim 10, wherein the plurality of first windowing output samples and the plurality of second windowing output samples are generated using a same number of delay taps.

17. A non-transitory computer-readable medium storing computer instructions for reducing crest factor, that when executed by one or more hardware processors of an electronic device, cause the electronic device to perform operations comprising:

- receiving a plurality of first samples of a first input signal, the plurality of first samples generated at a first sampling rate;
- performing a first peak detection based on the plurality of first samples to generate a plurality of first peak detection output samples;
- downsampling the plurality of first peak detection output samples to generate a plurality of first windowing input samples at a second sampling rate;
- generating a plurality of first windowing output samples based on the plurality of first windowing input samples;
- upsampling the plurality of first windowing output samples to generate a plurality of first peak reduction samples at the first sampling rate; and
- generating a first output signal based on the plurality of first samples and the plurality of first peak reduction samples.

18. The non-transitory computer-readable medium according to claim 17, wherein the first input signal comprises an input signal of a first carrier, and the operations further comprise:

- receiving a plurality of second samples of a second input signal, wherein the plurality of second samples are generated at the first sampling rate, and the second input signal comprises an input signal of a second carrier;
- performing a second peak detection based on the plurality of second samples to generate a plurality of second peak detection output samples;
- downsampling the plurality of second peak detection output samples to generate a plurality of second windowing input samples at a third sampling rate;
- generating a plurality of second windowing output samples based on the plurality of second windowing input samples;
- upsampling the plurality of second windowing output samples to generate a plurality of second peak reduction samples at the second sampling rate; and
- generating a second output signal based on the plurality of second samples and the plurality of second peak reduction samples.

19. The non-transitory computer-readable medium according to claim 18, wherein a ratio between the second sampling rate and the third sampling rate is the same as a ratio between a first bandwidth of the first carrier and a second bandwidth of the second carrier.

20. The non-transitory computer-readable medium according to claim 18, wherein the generating the first output signal comprises applying the plurality of first peak reduction samples on both I and Q channels of the plurality of first samples.

* * * * *